US012272877B2

(12) United States Patent
Choi et al.

(10) Patent No.: US 12,272,877 B2
(45) Date of Patent: Apr. 8, 2025

(54) ELECTRONIC DEVICE INCLUDING ANTENNA

(71) Applicant: SAMSUNG ELECTRONICS CO., LTD., Suwon-si (KR)

(72) Inventors: Bongsuk Choi, Suwon-si (KR); Minchang Shim, Suwon-si (KR); Soli Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 161 days.

(21) Appl. No.: 17/956,725

(22) Filed: Sep. 29, 2022

(65) Prior Publication Data

US 2023/0055640 A1 Feb. 23, 2023

Related U.S. Application Data

(63) Continuation of application No. PCT/KR2022/012206, filed on Aug. 16, 2022.

(30) Foreign Application Priority Data

Aug. 18, 2021 (KR) ........................ 10-2021-0108598

(51) Int. Cl.
*H01Q 21/06* (2006.01)
*H01Q 1/24* (2006.01)
*H01Q 9/04* (2006.01)

(52) U.S. Cl.
CPC ........... *H01Q 21/065* (2013.01); *H01Q 1/243* (2013.01); *H01Q 9/0414* (2013.01)

(58) Field of Classification Search
CPC .......... H01Q 1/142; H01Q 1/44; H01Q 1/243; H01Q 1/2266; H05K 5/006; H05K 7/12
See application file for complete search history.

(56) References Cited

U.S. PATENT DOCUMENTS 10,069,196 B1 9/2018 Yen et al.
11,013,149 B2 * 5/2021 Kim .................... H05K 5/0017
(Continued)

FOREIGN PATENT DOCUMENTS

CN 112272479 A 1/2021
KR 20200038034 A 4/2020
(Continued)

OTHER PUBLICATIONS

International Search Report and Written Opinion for International Application No. PCT/KR2022/012206; International Filing Date Aug. 16, 2022; Date of Mailing Nov. 18, 2022; 75 Pages.
(Continued)

*Primary Examiner* — Dimary S Lopez Cruz
*Assistant Examiner* — Austin M Back
(74) *Attorney, Agent, or Firm* — CANTOR COLBURN LLP

(57) ABSTRACT

An electronic device includes a housing, an antenna structure, and a support member. The housing provides a front surface, a rear surface, and a side surface of the electronic device. The antenna structure may be located in an inner space of the housing. The antenna structure may include a printed circuit board having a first surface facing the front surface and a second surface facing in a direction opposite to the first surface, and can include at least one antenna element. The support member may be combined with the housing. The antenna structure may be disposed on the support member. The support member on which the antenna structure is disposed may be inserted into a recess provided in a sidewall of the housing providing the side surface. The sidewall may include a connection portion, which may be combined with a front plate of the housing providing the front surface.

19 Claims, 17 Drawing Sheets

(56) References Cited

U.S. PATENT DOCUMENTS

| | | | | |
|---|---|---|---|---|
| 11,183,747 | B2 | 11/2021 | Moon et al. | |
| 11,303,014 | B2 | 4/2022 | Lim et al. | |
| 11,316,284 | B2 | 4/2022 | Cho et al. | |
| 11,503,143 | B2 | 11/2022 | Kallman et al. | |
| 11,522,296 | B2 | 12/2022 | Chen et al. | |
| 2017/0373376 | A1* | 12/2017 | Jo | H01Q 1/50 |
| 2020/0195410 | A1 | 6/2020 | Li et al. | |
| 2020/0203836 | A1 | 6/2020 | Park et al. | |
| 2021/0135378 | A1 | 5/2021 | Cho et al. | |
| 2022/0102869 | A1 | 3/2022 | Park | |

FOREIGN PATENT DOCUMENTS

| | | | |
|---|---|---|---|
| KR | 20200073745 | A | 6/2020 |
| KR | 20200132041 | A | 11/2020 |
| KR | 20200142801 | A | 12/2020 |
| KR | 20210030474 | A | 3/2021 |
| KR | 20210051472 | A | 5/2021 |
| KR | 20210069596 | A | 6/2021 |

OTHER PUBLICATIONS

Extended European Search Report corresponding to Application No. 22858716.8-1201; Dated Nov. 6, 2024.

* cited by examiner

ELECTRONIC DEVICE INCLUDING ANTENNA

CROSS-REFERENCE TO RELATED APPLICATION

This application is a continuation of International Application No. PCT/KR2022/012206, designating the United States, filed on Aug. 16, 2022, in the Korean Intellectual Property Receiving Office and claiming priority to Korean Patent Application No. 10-2021-0108598, filed on Aug. 18, 2021, in the Korean Intellectual Property Office, the disclosures of which are incorporated by reference herein in their entireties.

TECHNICAL FIELD

Various embodiments of the disclosure relate to an electronic device including an antenna.

BACKGROUND ART

With the growth of wireless communication technology, electronic devices are commonly used in daily life, and the use of various digital contents is increasing accordingly. The rapid increase in content usage may require the expansion of network processing capacity. An electronic device can include a plurality of antennas to support various communication technologies.

Technical Problem

As the range of applications that can be used in an electronic device such as a smartphone increases, the number of antennas included in the electronic device can also increase. Unfortunately, more and more components are needed to support the expanding variety of functions that are being added to electronic devices while, at the same time, the devices themselves are becoming slimmer. Consequently, it is difficult to position all of the antennas in an increasingly limited space within the device while also reducing electrical influences with various other elements in the electronic device and while securing radiation performance or ensuring coverage (or communication range) for a desired frequency band.

Solution to Problem

Various embodiments of the disclosure may provide an electronic device including an antenna for securing antenna radiation performance or ensuring coverage in a limited antenna design space.

According to an embodiment of the disclosure, an electronic device may include a housing, an antenna structure, and a support member. The housing may provide and include a front surface of the electronic device, a rear surface of the electronic device, and a side surface of the electronic device. The antenna structure may be located in an inner space of the housing. The antenna structure may include a printed circuit board having a first surface facing the front surface and a second surface facing in a direction opposite to the first surface, and include at least one antenna element located on the first surface or located inside the printed circuit board to be closer to the first surface than the second surface. The support member may be combined with the housing. The antenna structure may be disposed on the support member. The support member on which the antenna structure is disposed may be inserted into a recess provided in a sidewall of the side surface of the housing. The sidewall may include a connection portion. The connection portion may be combined with a front plate of the front surface of the housing, and may be formed along an edge of the front plate. The connection portion may overlap with the front plate when viewed from above the front surface. A non-conductive portion included in the connection portion may be located between the first surface and the front plate, overlap with the at least one antenna element when viewed from above the front surface, and provide at least in part a third surface among surfaces providing the recess, the third surface facing the first surface. The support member may include a first support portion inserted into a groove provided in the non-conductive portion.

According to an embodiment of the disclosure, an electronic device may include a housing, an antenna structure, and a support member. The housing may provide and include a front surface of the electronic device, a rear surface of the electronic device, and a side surface of the electronic device. The antenna structure may be located in an inner space of the housing. The antenna structure may include a printed circuit board and at least one antenna element. The printed circuit board may have a first surface facing the front surface, a second surface facing in a direction opposite to the first surface, a first side surface facing the side surface of the electronic device, a second side surface positioned opposite to the first side surface, and third and fourth side surfaces perpendicular to the first side surface and positioned opposite to each other. The at least one antenna element may be located on the first surface or located inside the printed circuit board to be closer to the first surface than the second surface. The support member may be combined with the housing. The antenna structure may be disposed on the support member. The support member on which the antenna structure is disposed may be inserted into a recess provided in a sidewall of the side surface of the housing. The sidewall may include a connection portion. The connection portion may be combined with a front plate of the front surface of the housing, and may be formed along an edge of the front plate. The connection portion may overlap with the front plate when viewed from above the front surface. A non-conductive portion included in the connection portion may be located between the first surface and the front plate, overlap with the at least one antenna element when viewed from above the front surface, and provide at least in part a third surface among surfaces providing the recess, the third surface facing the first surface. The support member may include a first support portion located to face the third side surface or the fourth side surface. A part of the first support portion may protrude with respect to the first surface and be inserted into a groove provided in the non-conductive portion, the groove in a form of a notch when viewed from above the front surface.

Advantageous Effects of Invention

The electronic device including the antenna according to various embodiments of the disclosure can reduce a bezel area surrounding a display area on the front surface of the electronic device to facilitate the expansion of the display area, and can also secure the radiation performance for the antenna that forms a beam passing through the bezel area.

In addition, effects obtainable or predictable from various embodiments of the disclosure will be explicitly or implicitly provided in the detailed description of the embodiments of the disclosure. For example, various effects predicted according to various embodiments of the disclosure will be described in the following description.

MODE FOR THE INVENTION

Hereinafter, various embodiments disclosed herein will be described with reference to the accompanying drawings.

Figure 1:
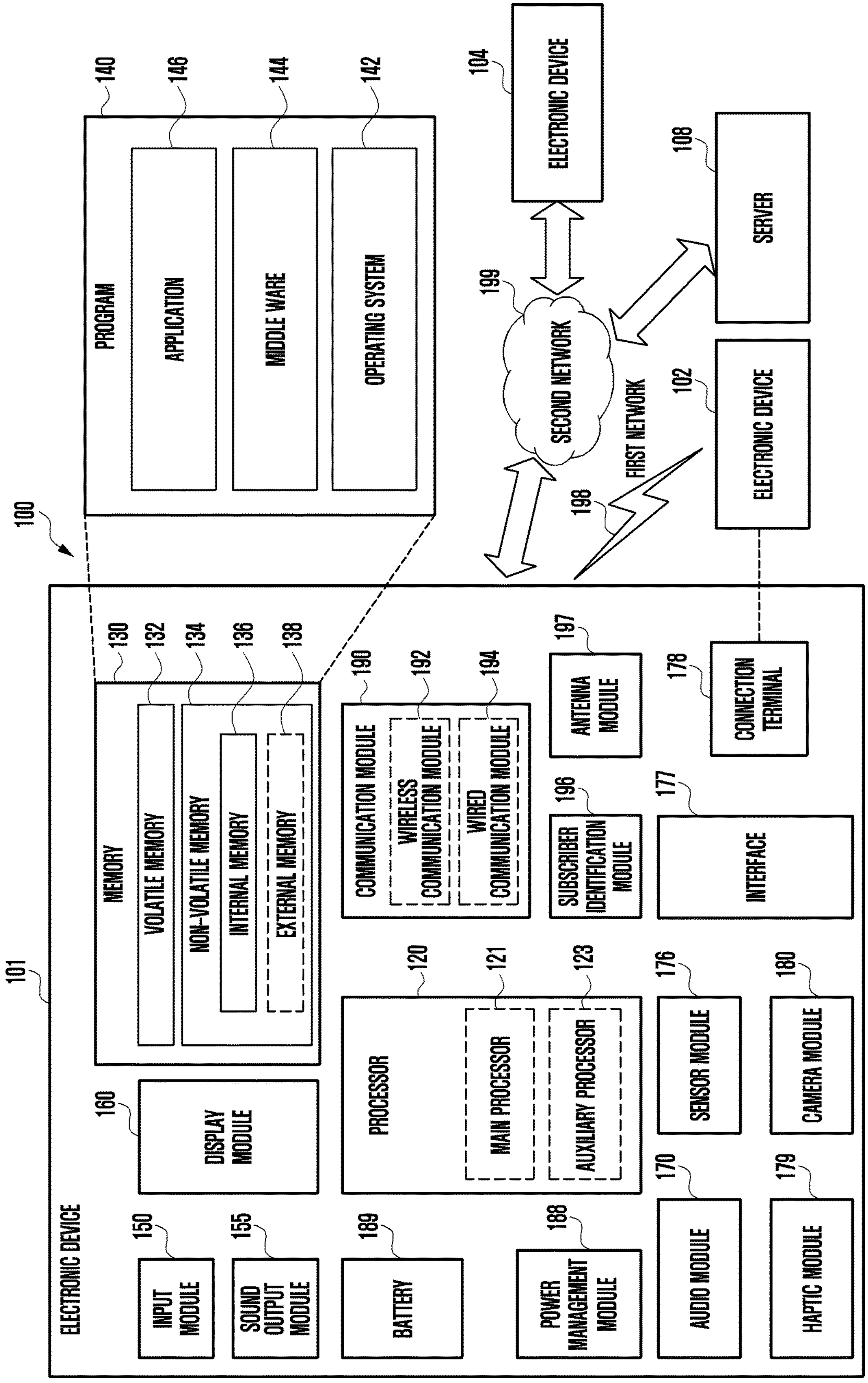
FIG. 1 is a block diagram of an electronic device in a network environment, according to an embodiment.

FIG. 1 is a block diagram of an electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuit to control a corresponding one of the display, hologram device, and projector. The display module 160 may include touch circuit (e.g., a touch sensor) adapted to detect a touch, or sensor circuit (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
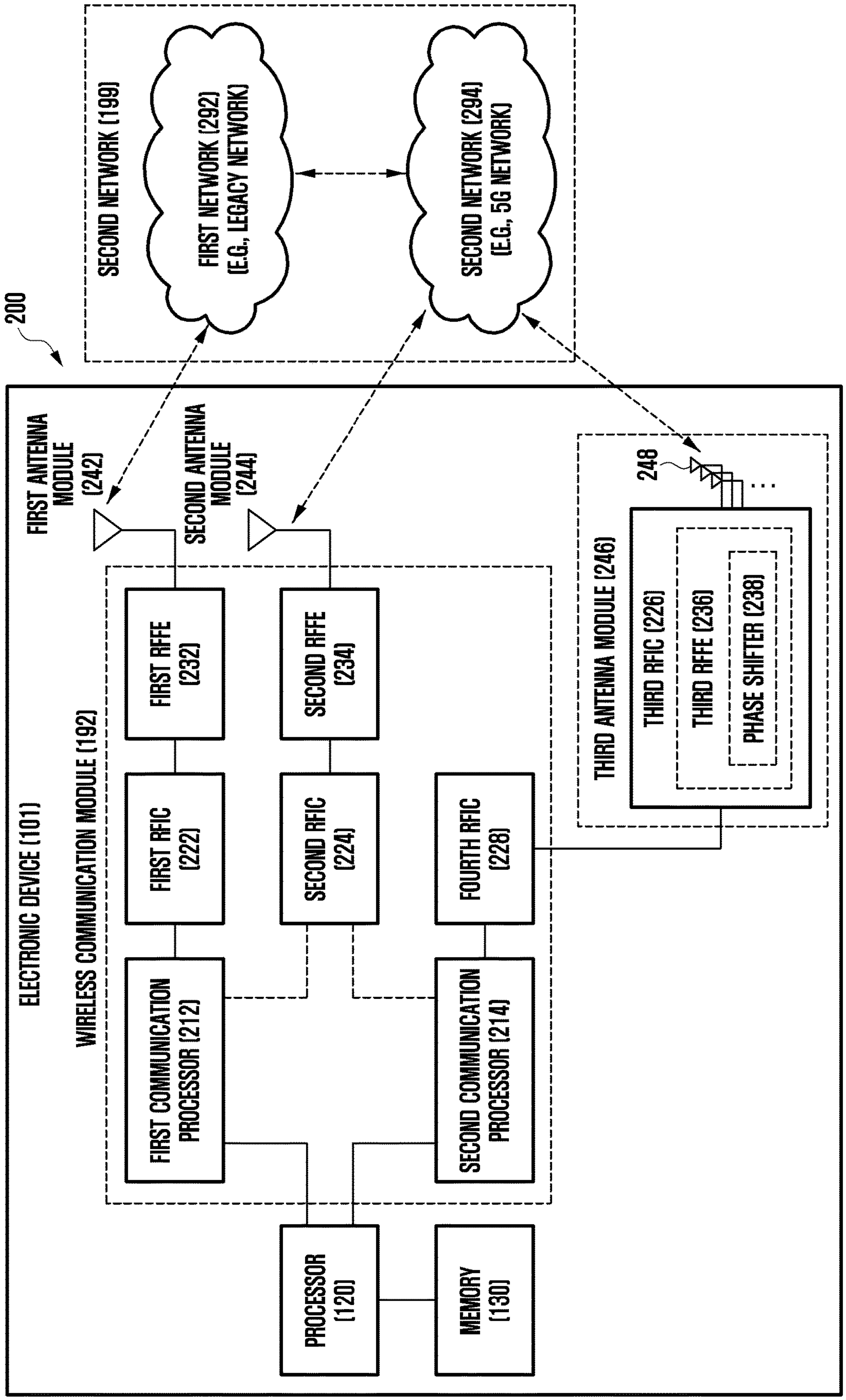
FIG. 2 is a block diagram illustrating an electronic device in a network environment including a plurality of cellular networks, according to an embodiment.

FIG. 2 is a block diagram 200 illustrating an electronic device in a network environment including a plurality of cellular networks according to according to an embodiment.

With reference to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand-alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figures 3A, 3B, 3C, 3D, 3E:
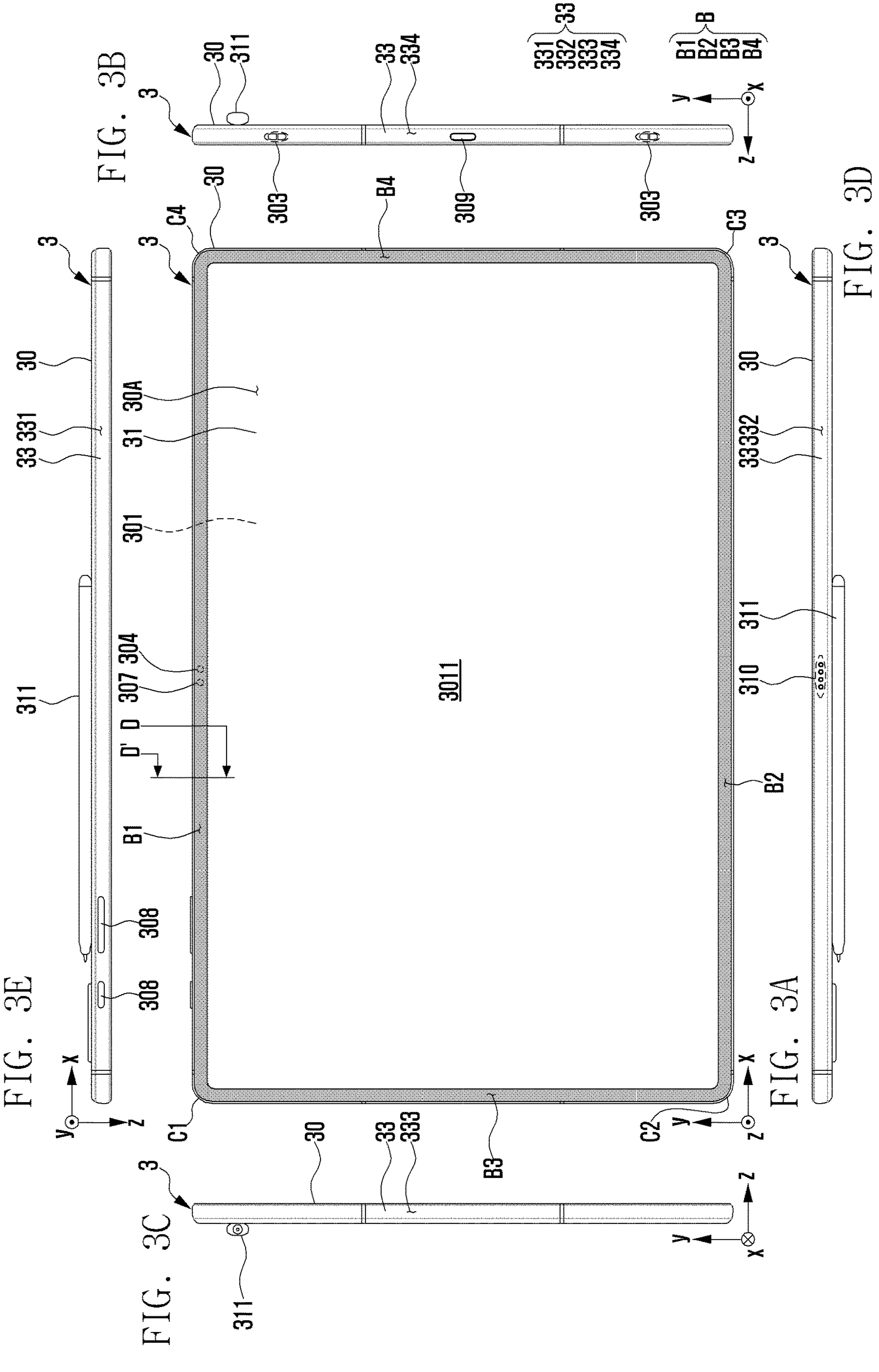
FIG. 3A is a front side view schematic illustrating an electronic device according to an embodiment.
FIG. 3B is a right side view of the electronic device of FIG. 3A.
FIG. 3C is a left side view of the electronic device of FIG. 3A.
FIG. 3D is a bottom side view of the electronic device of FIG. 3A.
FIG. 3E is a top side view of the electronic device of FIG. 3A.
Figure 4:
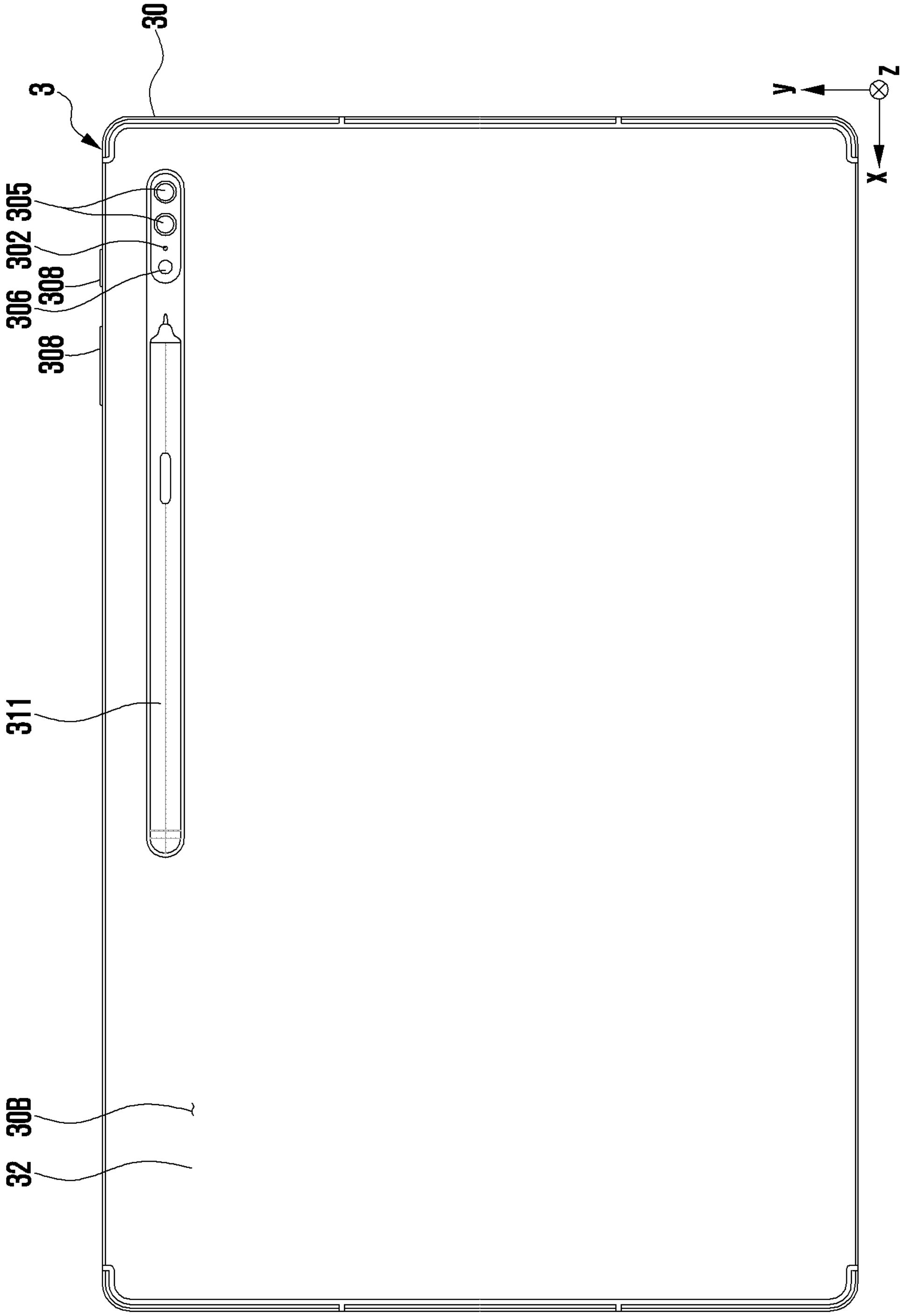
FIG. 4 is a rear side view of the electronic device of FIG. 3A.

FIG. 3A is a front side view schematic illustrating an electronic device 3 according to an embodiment. FIG. 3B is a right side view of the electronic device 3 of FIG. 3A. FIG. 3C is a left side view of the electronic device 3 of FIG. 3A. FIG. 3D is a bottom side view of the electronic device 3 of FIG. 3A. FIG. 3E is a top side view of the electronic device 3 of FIG. 3A. FIG. 4 is a rear side view of the electronic device 3 of FIG. 3A.

With reference to FIGS. 3A-3E and 4, the electronic device 3 (e.g., the electronic device 101 in FIG. 1) may include a housing 30 providing the external appearance of the electronic device 3. The housing 30 may have, for example, a front surface 30A of the electronic device 3, a rear surface 30B of the electronic device 3, and a side surface 30C of the electronic device 3 surrounding a space between the front surface 30A and the rear surface 30B. In some embodiments, the housing 30 may refer to a structure (e.g., a housing structure) that provides at least parts of the front surface 30A, the rear surface 30B, and the side surface 30C. In various embodiments of the disclosure, for convenience of explanation, the direction in which a display 301 included in the electronic device 3 is visually exposed is defined as the front surface 30A of the electronic device 3, and the opposite direction is defined as the rear surface 30B of the electronic device 3.

According to an embodiment, the housing 30 may include a front plate 31, a rear plate 32, and/or a side member 33. The front surface 30A of the electronic device 3 may be provided at least in part by the front plate 31. The front plate 31 may be substantially transparent and may include, for example, a glass plate or polymer plate having various coating layers. The rear surface 30B of the electronic device 3 may be provided at least in part by the rear plate 32. The rear plate 32 may be substantially opaque. The rear plate 32 may be formed by, for example, coated or tinted glass, ceramic, polymer, metal, or a combination of at least two of the above materials. In another example, the rear plate 32 may include aluminum, an aluminum alloy, magnesium, an magnesium alloy, or an iron-contained alloy (e.g., stainless steel). The side member 33 may at least partially surround the space between the front plate 31 and the rear plate 32. The side surface 30C of the electronic device 3 may be provided at least in part by the side member 33. In some embodiments, the side member 33 is an element that substantially provides the side surface 30C of the electronic device 3 and may be referred to as a 'side bezel structure' or a 'bezel structure'. The side member 33 may have, for example, metal and/or polymer. The side member 33 may be combined with the front plate 31 and the rear plate 32. For example, the side member 33 may be combined with the front plate 31 or the rear plate 32 by mechanical fastening using a mechanical fastening element such as a screw or bonding using an adhesive material.

According to some embodiments, the rear plate 32 and the side member 33 may be integrally formed and may include the same material (e.g., a metallic material such as aluminum and/or a non-metallic material such as polymer). A structure (or a housing structure) in which the rear plate 32 and the side member 33 are integrally formed may be referred to as, for example, a 'case'. A portion of the case that provides the rear surface 30B of the electronic device 3 may be referred to not only as the term 'rear plate', but also as any other term such as 'bottom' or 'rear portion'. A portion of the case that provides the side surface 30C of the electronic device 3 may be referred to not only as the term 'side member', but also as any other term such as 'side wall', 'side', 'border', or 'side portion'.

According to an embodiment, the side member 33 may include a first sidewall 331, a second sidewall 332, a third sidewall 333, and/or a fourth sidewall 334. When viewed from above the front surface 30A of the electronic device 3 (e.g., in the negative z-axis direction), the first sidewall 331 and the second sidewall 332 may be spaced apart from each other in a first direction (e.g., the y-axis direction) and may be substantially parallel to a second direction (e.g., the x-axis direction) orthogonal to the first direction. The third sidewall 333 may connect one end of the first sidewall 331 and one end of the second sidewall 332, and may be perpendicular to the first sidewall 331 or the second sidewall 332 when viewed from above the front surface 30A of the electronic device 3. The fourth sidewall 334 may connect the other end of the first sidewall 331 and the other end of the second sidewall 332, and may be perpendicular to the first sidewall 331 or the second sidewall 332 and substantially parallel to the third sidewall 333 when viewed from above the front surface 30A of the electronic device 3. The first sidewall 331 may provide a first side surface of the side surface 30C of the electronic device 3, and the second sidewall 332 may provide a second side surface of the side surface 30C of the electronic device 3. The third sidewall 333 may provide a third side surface of the side surface 30C of the electronic device 3, and the fourth sidewall 334 may provide a fourth side surface of the side surface 30C of the electronic device 3. A first corner C1 connecting the first sidewall 331 and the third sidewall 333 may be provided in a curved shape that seamlessly connects the first and third sidewalls. A second corner C2 connecting the second sidewall 332 and the third sidewall 333 may be provided in a curved shape that seamlessly connects the second and third sidewalls. A third corner C3 connecting the second sidewall 332 and the fourth sidewall 334 may be provided in a curved shape that seamlessly connects the second and fourth sidewalls. A fourth corner C4 connecting the first sidewall 331 and the fourth sidewall 334 may be provided in a curved shape that seamlessly connects the first and fourth sidewalls.

According to an embodiment, the electronic device 3 may include a display 301, a first audio module 302, a plurality of second audio modules 303, a first camera module 304, a plurality of second camera modules 305, a light emitting module 306, a sensor module 307, a plurality of input modules 308, a first connection terminal module 309, a second connection terminal module 310, or a pen input device 311. In some embodiments, the electronic device 3 may omit at least one of the above components or additionally include any other component.

The display 301 may be located in the inner space of the housing 30, and a display area (e.g., a screen display area or an active area) 3011 of the display 301 may be visually exposed through the front plate 31. In an embodiment, the electronic device 3 may be implemented such that the display area 3011 visible through the front plate 31 is viewed as large as possible (e.g., a large screen or a full screen). For example, the display 301 may be implemented to have an outer contour substantially the same as that of the front plate 31. In another example, a distance between the outer contour of the display 301 and the outer contour of the front plate 31 may be substantially the same. In an embodiment, the display 301 may include a touch sensing circuit. In some embodiments, the display 301 may include a pressure sensor capable of measuring the intensity (pressure) of a touch. In some embodiments, the display 301 may be coupled to or positioned adjacent to a digitizer (e.g., an electromagnetic induction panel) that detects an electronic pen (e.g., a stylus pen) of magnetic field type.

The first audio module 302 may include, for example, a microphone located in the inner space of the housing 30, and a microphone hole provided on the rear surface 30B to correspond to the microphone. The position or number of the audio modules related to the microphone is not limited to the illustrated example and may vary. In some embodiments, the electronic device 3 may include a plurality of microphones used to detect the direction of sound.

The plurality of second audio modules 303 may include, for example, a speaker located in the inner space of the housing 30, and a speaker hole provided on the side surface 30C to correspond to the speaker. The position or number of the second audio modules is not limited to the illustrated example and may vary. In some embodiments, the microphone hole and the speaker hole may be implemented as one hole. In some embodiments, the second audio module may include a piezo speaker that requires no speaker hole.

The first camera module 304 (e.g., a front camera module) may be located, for example, in the inner space of the housing 30 to correspond to the front surface 30A. The plurality of second camera modules 305 (e.g., rear camera modules) may be located, for example, in the inner space of the housing 30 to correspond to the rear surface 30B. The first camera module 304 and/or the plurality of second camera modules 305 may include one or a plurality of lenses, an image sensor, and/or an image signal processor. The position or number of the first camera module or the second camera modules is not limited to the illustrated example and may vary.

According to an embodiment, the first camera module 304 may be located in the inner space of the housing 30 to correspond to a bezel area B of the front plate 31. The bezel area B may be a region of the front plate 31 that does not overlap with the display area 3011 when viewed from above the front surface 30A of the electronic device 3 (e.g., in the negative z axis direction). The bezel area B may be provided, for example, in a shape (e.g., a rectangular annular shape when viewed from above the front surface 30A) surrounding the display area 3011 when viewed from above the front surface 30A. In an embodiment, the bezel area B may include a first bezel area B1, a second bezel area B2, a third bezel area B3, and/or a fourth bezel area B4. The first bezel area B1 may be located adjacent to the first sidewall 331 to correspond to the first sidewall 331. The second bezel area B2 may be located adjacent to the second sidewall 332 to correspond to the second sidewall 332. The third bezel area B3 may be located adjacent to the third sidewall 333 to correspond to the third sidewall 333. The fourth bezel area B4 may be located adjacent to the fourth sidewall 334 to correspond to the fourth sidewall 334. In an embodiment, the first camera module 304 may be located in the inner space of the housing 30 to correspond to the first bezel area B1, and the first bezel area B1 may include a first transparent region (or a first light transmitting region) corresponding to the first camera module 304. External light may pass through the first transparent region of the bezel area B and then reach the first camera module 304.

According to some embodiments, the display area 3011 may be implemented as large as possible, so that the bezel area B may be reduced differently from the illustrated example or substantially absent. In this case, the first camera module 304 may be located below or beneath the display area 3011. A function (e.g., image capturing) related to the first camera module 304 may be performed without visually distinguishing (or exposing) the position of the first camera module 304. For example, the first camera module 304 may be located on the rear surface of the display area 3011 or below the display area 3011, and may include a hidden display rear camera (e.g., an under display camera (UDC)). In some embodiments, the first camera module 304 may be positioned in and aligned with a recess provided on the rear surface of the display area 3011. The first camera module 304 may be disposed to overlap with the display area 3011 without being visually exposed to the outside, and may acquire an image of an external subject. A portion of the display area 3011 that overlaps at least in part with the first camera module 304 may include a pixel structure and/or a wiring structure different from the other portions. For example, a portion of the display area 3011 that overlaps at least in part with the first camera module 304 may have a pixel density different from the other portions. The pixel structure and/or the wiring structure provided in a portion of the display area 3011 that overlaps at least in part with the first camera module 304 may reduce light loss between the outside and the first camera module 304. In some embodiments, pixels may not be disposed in a portion of the display area 3011 that overlaps at least in part with the first camera module 304. In some embodiments, the display area 3011 may have a first opening aligned with the first camera module 304. External light may pass through the front plate 31 and the first opening of the display area 3011 and then reach the first camera module 304. The first opening in the display area 3011 may be provided in the form of, for example, a through-hole or a notch.

According to some embodiments, the electronic device 3 may further include a light emitting module (or light source) (not shown) located in the inner space of the housing 30 to correspond to the front surface 30A. The light emitting module may provide, for example, state information of the electronic device 3 in the form of light. In some embodiments, the light emitting module may provide a light source that interworks with the operation of the first camera module 304. The light emitting module may include, for example, an LED, an IR LED, or a xenon lamp.

According to an embodiment, the plurality of second camera modules 305 may have different properties (e.g., angle of view) or functions, and may include, for example, a dual camera or a triple camera. The plurality of second camera modules 305 may include a plurality of camera modules having lenses with different angles of view, and the electronic device 3 may control the angle of view of the camera module to be changed in response to a user's selection. The plurality of second camera modules 305 may include, for example, at least one of a wide-angle camera, a telephoto camera, a color camera, a monochrome camera, or an infrared (IR) camera (e.g., a time-of-flight (TOF) camera, a structured light camera). In some embodiments, the IR camera may operate as at least part of a sensor module. The light emitting module 306 (e.g., a flash) may include a light source for the plurality of second camera modules 305. The light emitting module 306 may include, for example, an LED or a xenon lamp.

In an embodiment, when viewed from above the rear surface 30B (e.g., in the positive z-axis direction), the plurality of second camera modules 305, the first audio module 302, or the light emitting module 306 may be located closer to the first sidewall 331 than the second sidewall 332 and closer to the fourth sidewall 334 than the third sidewall 333. When viewed from above the rear surface 30B, the plurality of second camera modules 305, the first audio module 302, and the light emitting module 306 may be arranged in a direction (e.g., in the positive x-axis direction) from the third sidewall 333 to the fourth sidewall 334. When viewed from above the rear surface 30B, the first audio module 302 may be positioned between the plurality of second camera modules 305 and the light emitting module 306.

The sensor module 307 may generate, for example, an electrical signal or data value corresponding to an internal operating state of the electronic device 3 or an external environmental state. In an embodiment, the sensor module 307 may include an optical sensor located in the inner space of the housing 30 to correspond to the front surface 30A. The optical sensor may include, for example, a proximity sensor or an illuminance sensor. The optical sensor may be located in the inner space of the housing 30 to correspond to the bezel area B of the front plate 31. In an embodiment, the optical sensor may be located in the housing 30 to correspond to the first bezel area B1, and the first bezel area B1 may have a second transparent region (or a second light-transmitting region) corresponding to the optical sensor. External light may pass through the second transparent region of the bezel region B and then reach the optical sensor. In the first bezel area B1, the first transparent region corresponding to the first camera module 304 and the second transparent region corresponding to the sensor module 307 may be located adjacent to each other. In the first bezel area B1, the remaining regions other than the first and second transparent regions may be formed to be substantially opaque. For example, the front plate 31 may include a substantially transparent plate (e.g., a glass plate or a polymer plate) and an opaque material layer (e.g., a light shielding sheet) disposed in a portion of the transparent plate to correspond to the bezel area B except for the first and second transparent regions. The opaque region of the bezel area B may correspond to a portion in which the opaque material layer is disposed. The opaque material layer may be disposed on the transparent plate by using a variety of methods such as coating or printing. In some embodiments, in the first bezel area B1, the first transparent region corresponding to the first camera module 304 and the second transparent region corresponding to the sensor module 307 may be replaced by one transparent region.

According to some embodiments, the display area 3011 may be implemented as large as possible, so that the bezel area B may be reduced differently from the illustrated example or substantially absent. In this case, the sensor module 307 (e.g., an optical sensor) may be located on the rear surface of the display area 3011 or below or beneath the display area 3011. A function (e.g., a sensing function) related to the sensor module 307 may be performed without visually distinguishing (or exposing) the position of the sensor module 307. In some embodiments, the sensor module 307 may be positioned in and aligned with a recess provided on the rear surface of the display area 3011. The sensor module 307 may be disposed to overlap with the display area 3011 without being visually exposed to the outside, and may perform a sensing function. A portion of the display area 3011 that overlaps at least in part with the sensor module 307 may include a pixel structure and/or a wiring structure different from the other portions. For example, a portion of the display area 3011 that overlaps at least in part with the sensor module 307 may have a pixel density different from other portions. The pixel structure and/or the wiring structure provided in a portion of the display area 3011 that overlaps at least in part with the sensor module 307 may reduce light loss between the outside and the sensor module 307. In some embodiments, pixels may not be disposed in a portion of the display area 3011 that overlaps at least in part with the sensor module 307. In some embodiments, the electronic device 3 may include a biometric sensor (e.g., a fingerprint sensor) positioned below the display 301. The biometric sensor may be implemented with an optical type, an electrostatic type, or an ultrasonic type, and the position or number thereof may vary. In some embodiments, the display area 3011 may have a second opening aligned with the sensor module 307 (e.g., an optical sensor). External light may pass through the front plate 31 and the second opening of the display area 3011 and then reach the sensor module 307. The second opening in the display area 3011 may be provided in the form of, for example, a through-hole or a notch. In some embodiments, one opening may be provided in the display area 3011 to replace the first opening corresponding to the first camera module 304 and the second opening corresponding to the sensor module 307, and the one opening may be provided in the form of a through-hole or a notch. The electronic device 3 may further include various other sensor modules, for example, at least one of a gesture sensor, a gyro sensor, a barometric pressure sensor, a magnetic sensor, an acceleration sensor, a grip sensor, a color sensor, an infrared (IR) sensor, a temperature sensor, or a humidity sensor.

The plurality of input modules 308 may include, for example, a key input device. The key input device may be located, for example, in an opening provided in the side surface 30C. In some embodiments, the electronic device 3 may not include some or all of key input devices, which may be implemented as soft keys using the display 301. The positions or number of input modules may vary, and in some embodiments, the input modules may include at least one sensor module.

The first connection terminal module (e.g., a connector module or an interface terminal module) 309 may include, for example, a connector (or an interface terminal) (e.g., a universal serial bus (USB) connector or a high definition multimedia interface (HDMI) connector), and a connector hole provided on the side surface 30C to correspond to the connector. The second connection terminal module (e.g., a second connector module or a second interface terminal module) 310 may include, for example, a plurality of terminals (or contact terminals) exposed to the side surface 30C. The electronic device 200 may transmit and/or receive power and/or data with an external electronic device electrically connected to the first connection terminal module 309 or the second connection terminal module 310. The positions or number of the connection terminal modules are not limited to the illustrated example and may vary. In some embodiments, the electronic device 3 may further include a connection terminal module for connecting a memory card (e.g., a secure digital memory (SD) card or a subscriber identity module (SIM) card).

According to an embodiment, the pen input device 311 (e.g., a stylus pen) may be detachably attached to the housing 30. For example, the pen input device 311 may be detachably attached to the rear surface 30B of the housing 30. The rear surface 30B may have a pen attaching area to which the pen input device 311 can be attached. The pen attaching area may be implemented to be visually distinguishable from the rear surface 30B. In an embodiment, when viewed from above the rear surface 30B (e.g., in the positive z-axis direction), the plurality of second camera modules 305, the first audio module 302, the light emitting module 306, and the pen attaching area may be arranged in a direction (e.g., the positive x-axis direction) from the third sidewall 333 to the fourth sidewall 334. When viewed from above the rear surface 30B, the light emitting module 306 may be positioned between the pen attaching area and the first audio module 302.

According to an embodiment, the pen input device 311 may be attached to the housing 30 through a magnetic body. For example, the pen input device 311 may be attached to the housing 30 through an attractive force between a magnetic body positioned in the pen input device 311 and a magnetic body positioned in the housing 30. In other various schemes, the pen input device 311 may be attached to the housing 30. For example (not shown), a scheme of inserting the pen input device 311 into the inner space of the housing 30 may be possible. In some embodiments, a scheme of detachably attaching the pen input device 311 to the front surface 30A or the side surface 30C may be implemented. For example, the scheme of detachably attaching the pen input device 311 to the front surface 30A may utilize the bezel area B as the pen attaching area.

According to an embodiment, the pen input device 311 may be implemented with an electromagnetic induction scheme (e.g., an electro-magnetic resonance (EMR) scheme). The pen input device 311 may include a resonance circuit, and the resonance circuit may interwork with an electromagnetic induction panel disposed in the inner space of the housing 30. In some embodiments, the pen input device 311 may be implemented with an active electrical stylus (AES) scheme or an electric coupled resonance (ECR) scheme.

Figure 5:
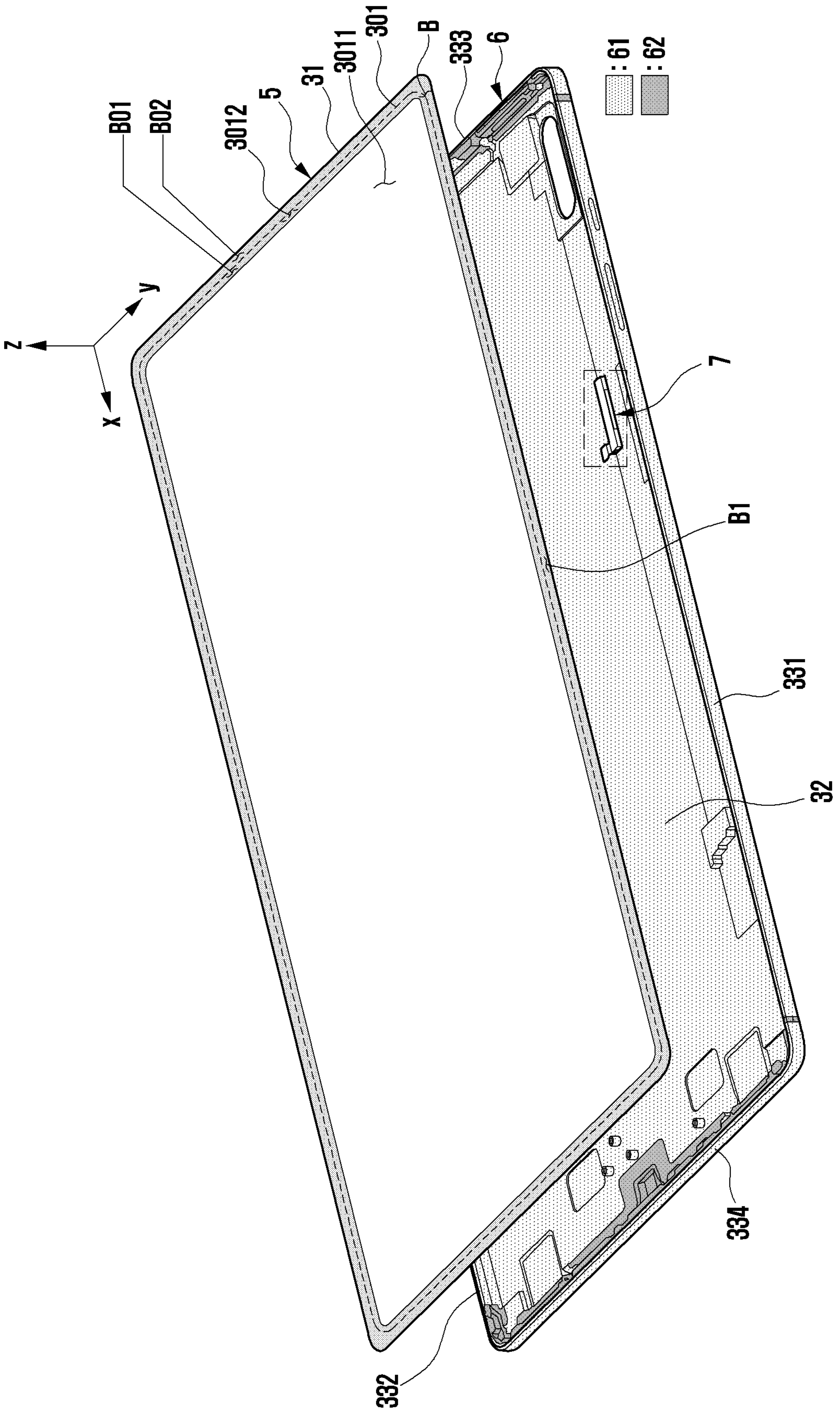
FIG. 5 is an exploded perspective view of an electronic device according to an embodiment.
Figure 6:
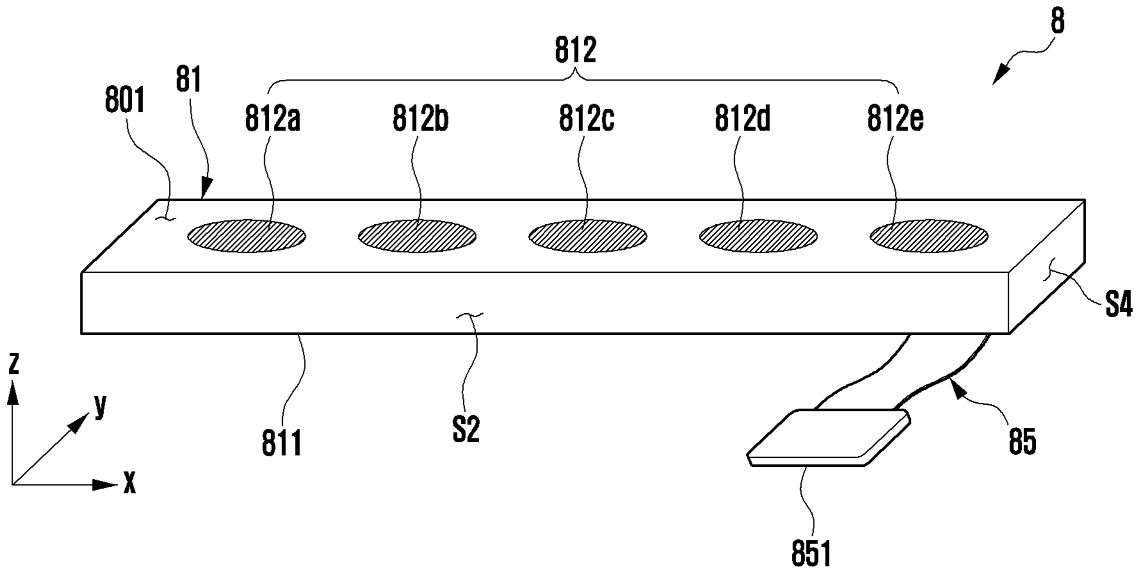
FIGS. 6 and 7 are perspective views of an antenna module included in an antenna module assembly according to an embodiment.
Figure 7:
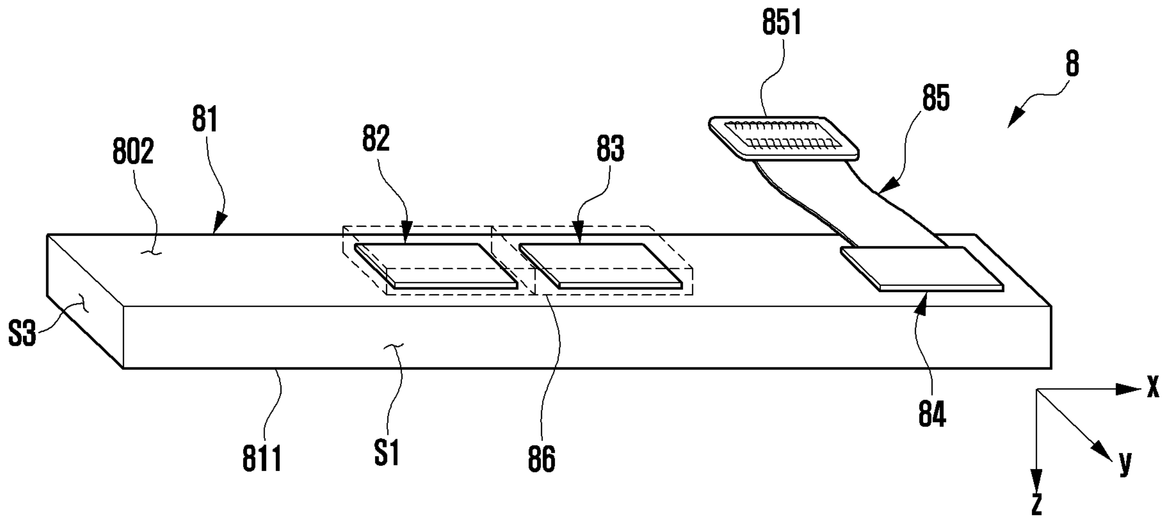

FIG. 5 is an exploded perspective view of an electronic device 3 according to an embodiment. FIGS. 6 and 7 are perspective views of an antenna module 8 included in an antenna module assembly 7 according to an embodiment.

With reference to FIG. 5, the electronic device 3 may include a display assembly 5, a case 6, and an antenna module assembly 7. The display assembly 5 may include a front plate 31 and a display 301 disposed on the rear surface of the front plate 31. Between the front plate 31 and the display 301, an optically transparent adhesive member (not separately illustrated) such as optical clear adhesive (OCA), optical clear resin (OCR), or super view resin (SVR) may be located. The front plate 31 may have the bezel area B that does not overlap with the display area 3011 of the display 301. The case 6 may have a rear plate 32, a first sidewall 331, a second sidewall 332, a third sidewall 333, and/or a fourth sidewall 334. The front plate 31 and the case 6 are combined with each other to provide the inner space of the electronic device 3 in which the display 301, the antenna module assembly 7, and various components not shown can be located.

According to an embodiment, the case 6 may include a conductive structure 61 and a non-conductive structure 62. The rear plate 32, the first sidewall 331, the second sidewall 332, the third sidewall 333, and the fourth sidewall 334 may be provided by a combination of the conductive structure 61 and the non-conductive structure 62. A portion of the conductive structure 61 may be included in the rear plate 32, and another portion of the conductive structure 61 may be included in the first sidewall 331, the second sidewall 332, the third sidewall 333, or the fourth sidewall 334. A portion of the non-conductive structure 62 may be included in the rear plate 32, and another portion of the non-conductive structure 62 may be included in the first sidewall 331, the second sidewall 332, the third sidewall 333, or the fourth sidewall 334.

The conductive structure 61 may include, for example, titanium, an amorphous alloy, a metal-ceramic composite material (e.g., cermet), or stainless steel. In another example, the conductive structure 61 may include magnesium, a magnesium alloy, aluminum, an aluminum alloy, a zinc alloy, or a copper alloy. The conductive structure 61 may also include other various metal and conductive materials. In an embodiment, the conductive structure 61 may be implemented using a machining method such as computer numerical control (CNC), die casting, or pressing.

In an embodiment, using insert molding, the non-conductive structure 62 may be formed to be combined with the conductive structure 61. For example, when placing the conductive structure 61 in a mold, followed by injecting a molten resin into an inner space of the mold and then cooling and taking out it, an integrated structure in which the conductive structure 61 and the non-conductive structure 62 are combined can be formed. In some embodiments, by performing the insert-injection molding after disposing an organic adhesive layer (e.g., a polymer adhesive material or sealant, not separately illustrated) on the conductive structure 61, the non-conductive structure 62 can bonded to the conductive structure 61 via the organic adhesive layer. The conductive structure 61 can be firmly and tightly bonded (e.g., TRI bonding) to the non-conductive structure 62 formed by the injection molding because of the organic adhesive layer. The organic adhesive layer may not only increase the bonding force between the conductive structure 61 and the non-conductive structure 62, but also contribute to waterproofing. The organic adhesive layer may include, for example, various polymers or sealants such as triazine thiol, dithio pyrimithin, or a silane-based compound. In some embodiments, by anodizing the conductive structure 61, forming the organic adhesive layer applied to the conductive structure 61, and then performing the insert-injection molding, the non-conductive structure 62 bonded to the organic adhesive layer can be molded. For example, the organic adhesive layer may be applied to the conductive structure 61 by flowing an electric current through an electrolyte solution (e.g., a sulfuric acid solution or a nitric acid solution). In this process of applying the organic adhesive layer, metal oxide and/or carbon may be contained in the organic adhesive layer formed on the conductive structure 61. In an embodiment, the conductive structure 61 may have a plurality of conductive portions physically separated by the non-conductive structure 62, and a portion of the non-conductive structure 62 may form an insulating portion located at a segmenting part between the plurality of conductive portions. Some of the plurality of conductive portions may be used as an antenna radiator.

According to an embodiment, the antenna module assembly 7 may be located between the display assembly 5 and the rear plate 32. The antenna module assembly 7 may include an antenna module 8 (see FIGS. 6 and 7) and a support member (e.g., the support member 9 in FIG. 8). The antenna module 8 may be located inside the electronic device 3 by using the support member. The support member may contribute to allowing the antenna module 8 to be stably located inside the electronic device 3. The support member may contribute to durability of the antenna module 8. In an embodiment, the antenna module 8 may be connected to the case 6 through the support member. The support member is an element for stably positioning the antenna module 8 inside the electronic device 3, and may be referred to as any other term such as 'support structure', 'connection structure', 'connection member', 'bracket', 'antenna module support member', 'antenna module support structure', or 'antenna module bracket'.

In an embodiment, when viewed from above the front plate 31 (e.g., when viewed in the negative z-axis direction), an antenna array (e.g., the antenna array 812) included in the antenna module 8 may overlap at least in part with the first bezel area B1. When the antenna module 8 transmits or receives a frequency signal through the antenna array, the radio wave related to the frequency signal may pass through the first bezel area B1 and travel to the outside of the electronic device 3. In some embodiments, when viewed from above the front plate 31, an area that overlaps with the antenna array included in the antenna module 8 in the first bezel area B1 may be referred to as a radio frequency (RF) window area. To reduce the influence of the front plate 31 on the radiation performance or coverage of the antenna module 8, the RF window area may include a non-conductive material. In an embodiment, the entire bezel area B may substantially include a non-conductive material. In some embodiments, the RF window area of the bezel area B may include a non-conductive material, and at least a portion of the remaining areas of the bezel area B may include a conductive material.

With reference to FIGS. 6 and 7, the antenna module 8 may include an antenna structure 81, a communication circuit 82, a power management circuit 83, a connector 84, and/or an electrical path 85. The antenna module 8 may be, for example, the third antenna module 246 in FIG. 2.

According to an embodiment, the antenna structure 81 may include a printed circuit board 811 on which an antenna array 812 is disposed. The printed circuit board 811 may have a first surface 801 and a second surface 802 facing in a direction opposite to the first surface 801. The first surface 801 and the second surface 802 may be substantially parallel, for example. The antenna array 812 may include a plurality of antenna elements 812*a*, 812*b*, 812*c*, 812*d*, and 812*e* disposed on the first surface 801 or inside the printed circuit board 811 closer to the first surface 801 than the second surface 802. The plurality of antenna elements 812*a*, 812*b*, 812*c*, 812*d*, and 812*e* may be, for example, the antenna 248 in FIG. 2. In an embodiment, the plurality of antenna elements 812*a*, 812*b*, 812*c*, 812*d*, and 812*e* may have substantially the same shape and may be disposed at regular intervals. In an embodiment, one or more of the antenna elements 812*a*, 812*b*, 812*c*, 812*d*, and 812*e* can have a different shape and/or can be disposed irregularly with respect to one or more of the other antenna elements 812*a*, 812*b*, 812*c*, 812*d*, and 812*e*. In an embodiment, the plurality of antenna elements 812*a*, 812*b*, 812*c*, 812*d*, and 812*e* may transmit and/or receive signals of substantially the same frequency band. In an embodiment, one or more of the antenna elements 812*a*, 812*b*, 812*c*, 812*d*, and 812*e* may transmit and/or receive signals of a different (overlapping or nonoverlapping) frequency band(s). The printed circuit board 811 may include a plurality of conductive layers (e.g., a plurality of conductive pattern layers) and a plurality of non-conductive layers (e.g., insulating layers) alternately stacked with the plurality of conductive layers. The plurality of antenna elements 812*a*, 812*b*, 812*c*, 812*d*, and 812*e* may be implemented, for example, by at least some of the plurality of conductive layers. In some embodiments, the number, relative positions, shape, and/or size of antenna elements included in the antenna array 812 may vary without being limited to the embodiment shown in FIG. 6.

According to an embodiment, the plurality of antenna elements 812*a*, 812*b*, 812*c*, 812*d*, and 812*e* may operate as a patch antenna. In some embodiments, the shape of the plurality of antenna elements 812*a*, 812*b*, 812*c*, 812*d*, and 812*e* may vary without being limited to a circular shape according to the embodiment in FIG. 6. For example, the plurality of antenna elements 812*a*, 812*b*, 812*c*, 812*d*, and 812*e* may be provided in a square or oval shape. In an embodiment, the antenna elements 812*a*, 812*b*, 812*c*, 812*d*, and 812*e* may be provided in a single-layer structure included in the printed circuit board 811. In some embodiments, the antenna elements 812*a*, 812*b*, 812*c*, 812*d*, and 812*e* may be implemented as a stack structure that includes a plurality of conductive portions (e.g., conductive patches) located on different layers of the printed circuit board 811 and overlapping with each other. In some embodiments, the number or locations of antenna arrays may vary without being limited to the embodiment shown in FIG. 6. Although not shown, the antenna structure 81 may further include an antenna array that includes a plurality of antenna elements operating as a dipole antenna. In some embodiments, the plurality of antenna elements 812*a*, 812*b*, 812*c*, 812*d*, and 812*e* may operate as an antenna other than a patch antenna or a dipole antenna.

According to an embodiment, the communication circuit (or wireless communication circuit) 82 may be disposed on the second surface 802 of the printed circuit board 811 using a conductive adhesive material such as solder. For example, the communication circuit 82 may be electrically connected to the plurality of antenna elements 812*a*, 812*b*, 812*c*, 812*d*, and 812*e* through wirings (e.g., an electrical path made of a conductive pattern or conductive via) included in the printed circuit board 811. In another example, the communication circuit 82 may be disposed on a printed circuit board (e.g., a printed circuit board where components such as the processor 120, the memory 130, or the communication module 190 shown in FIG. 1 are disposed) different from the printed circuit board 811. In an embodiment, the communication circuit 82 may include a radio frequency integrate circuit (RFIC). For example, the communication circuit 82 may be the third RFIC 226 in FIG. 2.

According to an embodiment, the communication circuit 82 may transmit and/or receive a signal in at least a partial frequency band between about 3 GHz and about 100 GHz through the antenna array 812. The communication circuit 82 may up-convert or down-convert a frequency for the transmitting or receiving signal. The communication circuit 82 may receive an intermediate frequency (IF) signal from a wireless communication circuit (e.g., the wireless communication module 192 in FIG. 1) disposed on another printed circuit board, and up-convert the received IF signal to a radio frequency (RF) signal (e.g., millimeter wave). The communication circuit 82 may down-convert an RF signal received through the antenna array 812 into an IF signal, and provide the IF signal to a wireless communication circuit board (e.g., the wireless communication module 192 in FIG. 1) disposed on another printed circuit.

According to an embodiment, the plurality of antenna elements 812*a*, 812*b*, 812*c*, 812*d*, and 812*e* may be fed directly or indirectly from the communication circuit 82 and thereby operate as an antenna radiator.

According to some embodiments, the plurality of antenna elements 812*a*, 812*b*, 812*c*, 812*d*, and 812*e* may be used as a dummy element (e.g., a dummy antenna, a dummy patch, or a conductive patch). The dummy element may be physically separated from other conductive elements and be in an electrically floating state. When viewed from above the first surface 801, the antenna module 8 may include a plurality of feed antenna elements (not shown) that overlap at least in part with and are physically separated from the plurality of antenna elements 812*a*, 812*b*, 812*c*, 812*d*, and 812*e*. The plurality of feed antenna elements may be electrically connected to the communication circuit 82, and the plurality of antenna elements 812*a*, 812*b*, 812*c*, 812*d*, and 812*e* may be indirectly fed from the plurality of feed antenna elements to operate as an antenna radiator.

According to an embodiment, the antenna structure 81 may include a ground plane (or a ground layer, not shown) implemented with at least a portion of a plurality of conductive layers included in the printed circuit board 811. The ground plane may be disposed between the antenna array 812 and the second surface 802 and, when viewed from above the first surface 801, may overlap at least in part with the antenna array 812. In some embodiments (not shown), the antenna module 8 may further include an antenna array operating as a dipole antenna. In this case, the ground plane included in the printed circuit board 811 may not overlap with the antenna array operating as a dipole antenna.

According to an embodiment, the power management circuit 83 may be disposed on the second surface 802 of the printed circuit board 811 by using a conductive adhesive material such as solder. In another example, the power management circuit 83 may be disposed on a printed circuit board (e.g., a printed circuit board where components such as the processor 120, the memory 130, or the communication module 190 shown in FIG. 1 are disposed) different from the printed circuit board 811. The power management circuit 83 may be electrically connected to the communication circuit 82 or other various components (e.g., the connector 84 or a passive element) disposed on the printed circuit board 811 through wirings (e.g., an electrical path made of a conductive pattern or conductive via) included in the printed circuit board 811. In an embodiment, the power management circuit 83 may be a power management integrated circuit (PMIC).

According to an embodiment, the connector 84 may be disposed on the second surface 802 of the printed circuit board 811 by using a conductive adhesive material such as solder. One end of the electrical path 85, such as a flexible printed circuit board, may be connected to the connector 84 (e.g., a FPCB connector). In some embodiments, one end of the electrical path 85 may be electrically connected to conductive terminals (e.g., lands or copper foil pads) located on the second surface 802 of the printed circuit board 811 by using a conductive adhesive material such as solder, and in this case, the connector 84 may be omitted. The other end of the electrical path 85 may have a connector 851 for electrical connection with another printed circuit board (e.g., a printed circuit board where components such as the processor 120, the memory 130, or the communication module 190 shown in FIG. 1 are disposed).

According to some embodiments, the antenna module 8 may be defined by omitting at least one component (e.g., the electrical path 85), or one or more other components may be added to the antenna module 8.

According to some embodiments, the antenna module 8 may further include a shielding member (or electromagnetic shielding member) 86 positioned on the second surface 802 to enclose at least one of the communication circuit 82 and/or the power management circuit 83. The shielding member 86 may electromagnetically shield the communication circuit 82 and/or the power management circuit 83. The shielding member 86 may include, for example, a conductive member such as a shield can. In another example, the shielding member 86 may include a protective member such as urethane resin, and a conductive paint such as an EMI paint applied to the outer surface of the protective member. In some embodiments, the shielding member 86 may be implemented with various shielding sheets disposed to cover the second surface 802.

According to some embodiments (not shown), the antenna module 8 may further include a frequency adjustment circuit disposed on the printed circuit board 811. The frequency adjustment circuit such as a tuner or passive element may shift an impedance matching or resonant frequency to a specified frequency or by a specified amount.

According to an embodiment, when the antenna module 8 is positioned between the display assembly 5 and the case 6, the first surface 801 of the printed circuit board 811 may face the front surface 30A (see FIG. 3) or the front plate 31 (e.g., in the positive z-axis direction), and the second surface 802 of the printed circuit board 811 may face the rear plate 32 of the electronic device 3 (see FIG. 5) (e.g., in the negative z-axis direction). The printed circuit board 811 may have a first side surface S1, a second side surface S2, a third side surface S3, and/or a fourth side surface S4. The first side surface S1 and the second side surface S2 may be located opposite to each other. The third side surface S3 and the fourth side surface S4 may be located opposite to each other. The first side surface S1, the second side surface S2, the third side surface S3, and/or the fourth side surface S4 may be perpendicular to the first surface 801 or the second surface 802. The third side surface S3 or the fourth side surface S4 may be, for example, perpendicular to the first side surface S1 or the second side surface S2 when viewed from above the first surface 801 (e.g., when viewed in the negative z-axis direction). When the antenna module 8 is positioned between the display assembly 5 and the case 6, the first side surface S1 may face the first sidewall 331 of the case 6 (e.g., in the positive y-axis direction). When the antenna module 8 is positioned between the display assembly 5 and the case 6, the third side surface S3 may face the third sidewall 333 of the case 6 (e.g., in the negative x-axis direction), and the fourth side surface S4 may face the fourth sidewall 334 (e.g., in the positive x-axis direction).

According to an embodiment, the antenna structure 81 may be inserted into a recess (or recess structure, not shown) provided in the case 6. The recess may have, for example, a concave space provided in the first sidewall 331 within the inner space of the housing 30 (see FIGS. 3 and 5). A structure in which the antenna structure 81 is located (e.g., a recess of the case 6) can reduce, compared to a structure in which the antenna structure 81 is not located in the recess, an overlap area between the first surface 801 of the antenna structure 81 and the display 301 when viewed from above the front plate 31 (e.g., when viewed in the negative z-axis direction). In other words, the structure in which the antenna structure 81 is located (e.g., the recess of the case 6) can contribute to reducing overlap between the antenna array 812 of the antenna structure 81 and the display 301 when viewed from above the front plate 31.

In an embodiment, when viewed from above the front plate 31, the display 301 may include a border area 3012 (see FIG. 5) that overlaps in part with the bezel area B. The border area 3012 may be formed to extend from the display area 3011 when viewed from above the front plate 31. For example, the border area 3012 may be an annular shape surrounding the display area 3011 when viewed from above the front plate 31. In the border area 3012, for example, a circuit or wiring related to the display area 3011 may be contained. In some embodiments, a display driving circuit (e.g., a display drive integrated circuit (DDI)) may be disposed on the rear surface of the border area (edge region) 3012.

When viewed from above the front plate 31, the bezel area B may have a first area B01 that overlaps with the border area 3012 of the display 301, and a second area B02 that does not overlap with the border area 3012 of the display 301. The second area B02 may be formed in an annular shape surrounding the first area B01 when viewed from above the front plate 31. When viewed from above the front plate 31, the structure in which the antenna structure 81 is located (e.g., the recess of the case 6) can structurally ensure that the antenna array 812 of the antenna structure 81 does not overlap the first area B01 of the bezel area B and instead overlaps the second area B02 of the bezel area B. When the antenna structure 81 transmits or receives a frequency signal, the radio wave related to the frequency signal may substantially penetrate the second area B01 of the bezel area B and travel to the outside of the electronic device 3. Because the antenna array 812 of the antenna structure 81 does not overlap with the first area B01 of the bezel area B when viewed from above the front plate 31, the electromagnetic influence of the display 301 on the antenna structure 81 may be reduced. When viewed from above the front plate 31, the area that overlaps with the antenna array 812 of the antenna structure 81, or the area through which a beam (e.g., a main beam) formed by the antenna array 812 passes, within the second area B02 of the bezel area B, may be referred to as an RF window area. In some embodiments, when viewed from above the front plate 31, at least a portion of the border area 3012 of the display 301 that overlaps with the first surface 801 of the antenna structure 81 may be omitted.

Figure 8:
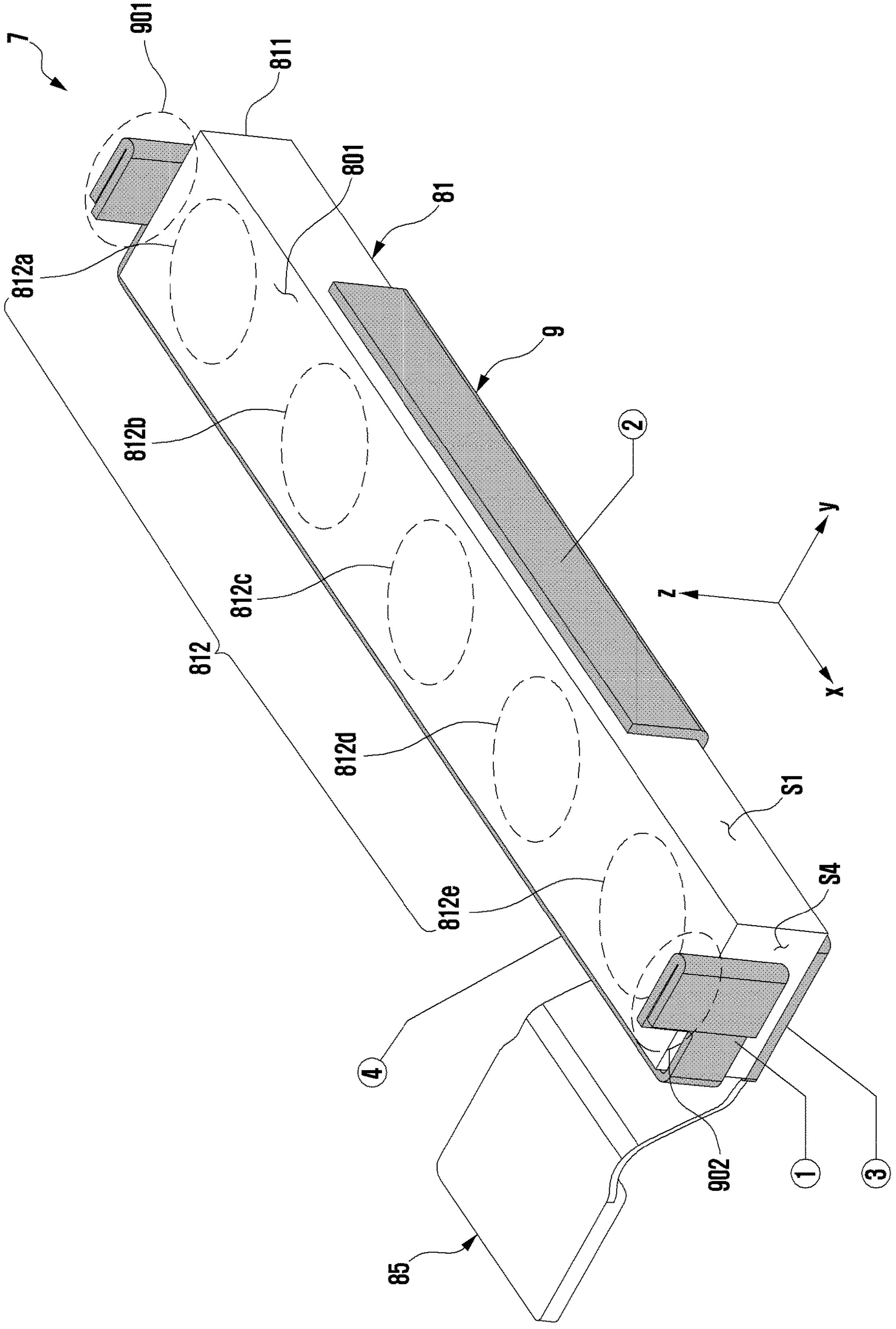
FIG. 8 is a perspective view of an antenna module assembly according to an embodiment.
Figure 9:
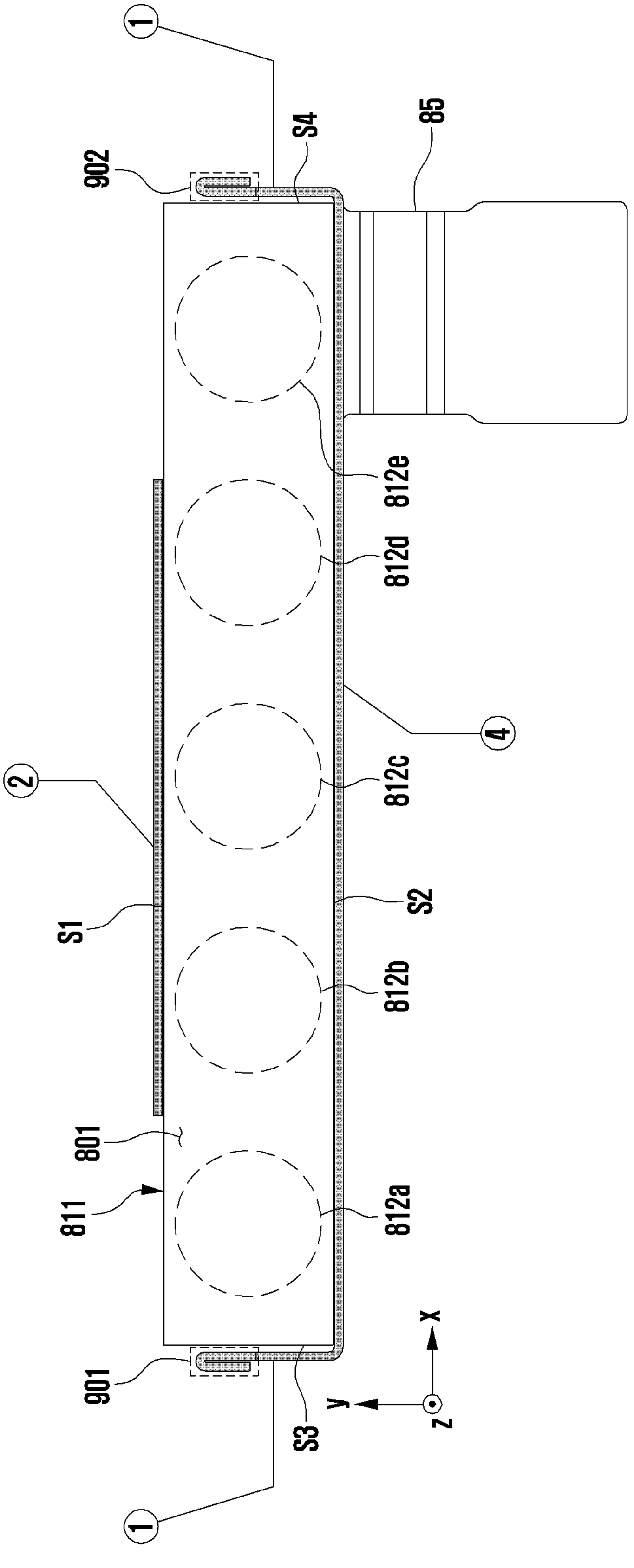
FIG. 9 is a diagram illustrating an antenna module assembly according to an embodiment.

FIG. 8 is a perspective view of an antenna module assembly 7 according to an embodiment. FIG. 9 is a diagram illustrating an antenna module assembly 7 according to an embodiment.

With reference to FIGS. 8 and 9, the antenna module assembly 7 may include the antenna module 8 (see FIGS. 6 and 7) and a support member 9 which the antenna module 8 is disposed on or combined with. In an embodiment, the antenna structure 81 may be connected to the case 6 (see FIG. 5) by using the support member 9. The support member 9 may be combined with or fixed to the case 6, and the antenna module 8 may be stably positioned in the inner space of the housing 30 (see FIG. 3) through the support member 9. The support member 9 may contribute to the durability of the antenna module 8.

In an embodiment, the support member 9 may include a pair of first support portions ①, a second support portion ②, a third support portion ③, and/or a fourth support portion ④. In an embodiment, the third support portion ③ may face the second surface 802 (see FIG. 7) of the printed circuit board 811 or cover or support the second surface 802. In an embodiment, the second support portion ② may extend from the third support portion ③ and face the first side surface S1 of the printed circuit board 811 or cover or support the first side surface S1. In an embodiment, the fourth support portion ④ may extend from the third support portion ③ and face the second side surface S2 of the printed circuit board 811 or cover or support the second side surface S2.

When viewed from above the first surface 801 of the printed circuit board 811, the second support portion ② and the fourth support portion ④ may be positioned opposite to each other and perpendicular to the third support portion ③. The pair of first support portions ① may extend from the fourth support portion ④ (as shown). In some embodiments, the pair of first support portions ① may extend from the third support portion ③ (not separately shown). In some embodiments, the pair of first support portions ① may extend from both the third support portion ③ and the fourth support portion ④ (not separately shown).

One of the pair of first support portions ① may face the third side surface S3 of the printed circuit board 811 or cover or support the third side surface S3. The other one of the pair of first support portions ① may face the fourth side surface S4 of the printed circuit board 811 or cover or support the fourth side surface S4. When viewed from above the first surface 801 of the printed circuit board 811, the pair of first support portions ① may be positioned opposite to each other and perpendicular to the second support portion ②, the third support portion ③, or the fourth support portion ④. In an embodiment, the pair of first support portions ① may be symmetrically positioned with respect to the printed circuit board 811. The pair of first support portions ①, the second support portion ②, the third support portion ③, or the fourth support portion ④ may have a plate form corresponding to each corresponding surface of the printed circuit board 811. The support member 9 may be implemented, for example, as an integral metal or non-metal structure having a bent portion. In some embodiments, the support member 9 may include various metal materials such as stainless steel. In some embodiments, the support member 9 may include a non-metallic material such as engineering plastics (including, e.g., wear-resistance plastics such as acrylonitrile butadiene styrene (ABS) based plastic, polycarbonates, thermoplastics, etc.). The pair of first support portions ①, the second support portion ②, the third support portion ③, and the fourth support portion ④ may, due to their configuration, allow the antenna structure 81 to be stably positioned on the support member 9. In some embodiments, the support member 9 on which the antenna structure 81 is disposed may vary without being limited to the illustrated example.

In some embodiments, the third support portion ③ of the support member 9 may have an opening or recess into which a component (e.g., the communication circuit 82, the power management circuit 83, and/or the connector 84 in FIG. 7) disposed on the second surface 802 (see FIG. 7) of the printed circuit board 811 can be located. In some embodiments, the third support portion ③ of the support member 9 can include a portion that extends, curves, or otherwise bends away from a surface of the antenna structure 81 (see FIGS. 16 and 17).

According to an embodiment, an adhesive member (not separately illustrated) may be positioned between the third support portion ③ of the support member 9 and the second surface 802 (see FIG. 7) of the printed circuit board 811. For example, the second surface 802 of the printed circuit board 811 may be disposed on or combined with the third support portion ③ of the support member 9 by using a heat-reactive adhesive material, a photo-reactive adhesive material, a general adhesive, or a double-sided tape.

According to an embodiment, between the second support portion ② of the support member 9 and the first side surface S1 of the printed circuit board 811, and/or between the fourth support portion ④ of the support member 9 and the second side surface S2 of the printed circuit board 811, an adhesive member (e.g., a heat-reactive adhesive material, a photo-reactive adhesive material, a general adhesive, or a double-sided tape, not separately illustrated) may be positioned.

According to some embodiments, between one of the pair of support portions ① included in the support member 9 and the third side surface S3 of the printed circuit board 811, and/or between the other one of the pair of support portions ① included in the support member 9 and the fourth side surface S4 of the printed circuit board 811, an adhesive member (e.g., a heat-reactive adhesive material, a photo-reactive adhesive material, a general adhesive, or a double-sided tape, not separately illustrated) may be positioned.

According to an embodiment, when viewed from above the first surface 801 of the printed circuit board 811 (e.g., when viewed in the negative z-axis direction), the support member 9 may not overlap with the first surface 801 and/or the antenna array 812, thereby reducing the influence of the support member 9 on the radiation performance of the antenna module 8. In some embodiments, when viewed from above the first surface 801 of the printed circuit board 811, the support member 9 may include a fifth support portion (not shown) that covers an area of the first surface 801 that does not overlap with the antenna array 812. The fifth support portion may be, for example, positioned so as not to substantially affect the radiation performance of the antenna module 8. The fifth support portion may extend from at least one of the plurality of first support portions ①, the second support portion ②, the third support portion ③, and/or the fourth support portion ④. In some embodiments, the fifth support portion may be formed in the form of a hook that prevents the antenna structure 81 from being separated in the positive z-axis direction.

According to an embodiment, the second support portion ② of the support member 9 may be disposed on or combined with the case 6 (see FIG. 5) by using an adhesive member (e.g., a heat-reactive adhesive material, a photo-reactive adhesive material, a general adhesive, or a double-sided tape, not separately illustrated). The combination of the second support portion ② and the case 6 can contribute for the support member 9, on which the antenna structure 81 is disposed, to be stably positioned in the case 6.

According to an embodiment, the third support portion ③ of the support member 9 may be supported by the rear plate 32 (see FIG. 5). The rear plate 32 may support the support member 9 toward the front plate 31 (see FIG. 5). For example, the rear plate 32 may support the third support portion ③ of the support member 9, on which the antenna structure 81 is disposed, substantially in the positive z-axis direction (e.g., vertical support). A structure in which the rear plate 32 supports the third support portion ③ of the support member 9 can contribute for the support member 9, on which the antenna structure 81 is disposed, to be stably positioned in the case 6.

According to some embodiments, an adhesive material (e.g., a heat-reactive adhesive material, a photo-reactive adhesive material, a general adhesive, or a double-sided tape, not separately illustrated) may be positioned between the rear plate 32 and the third support portion ③ of the support member 9. In some embodiments, a flexible member (not shown) such as a rubber may be positioned between the rear plate 32 and the third support portion ③ of the support member 9.

According to an embodiment, one of the pair of first supporting portions ① may have a first insert (or first protrusion) 901 protruding with respect to the first surface 801 of the printed circuit board 811, and the other may have a second insert (or second protrusion) 902. The first insert 901 may be inserted into a first groove (e.g., a first notch 1061, see FIG. 10B) included in the case 6 (see FIG. 5), and the second insert 902 may be inserted into a second groove (e.g., a second notch 1062, see FIG. 10B) included in the case 6. The first insert 901 and the corresponding first groove and the second insert 902 and the corresponding second groove may be used to guide the location of the support member 9 on which the antenna structure 81 is disposed, when the support member 9 is positioned in the case 6. The first insert 901 and the corresponding first groove and the second insert 902 and the corresponding second groove may contribute for the support member 9, on which the antenna structure 81 is disposed, to be stably placed at a designated position of the case 6. In some embodiments, the insert (e.g., the first insert 901 or the second insert 902) formed in the first support portion ① of the support member 9 may be referred to as other various terms such as a 'guide portion' or a 'guide protrusion'. In some embodiments, the groove (e.g., the first groove or the second groove) of the case 6 may be referred to as other various terms such as a 'guide groove' or a 'guide notch'.

According to an embodiment, each of the pair of first support portions ① included in the support member 9 may have a hemming structure. A part of the hemming structure included in one of the pair of support portions ① may include the first insert 901, and a part of the hemming structure included in the other of the pair of support portions ① may include the second insert 902.

Figure 10A:
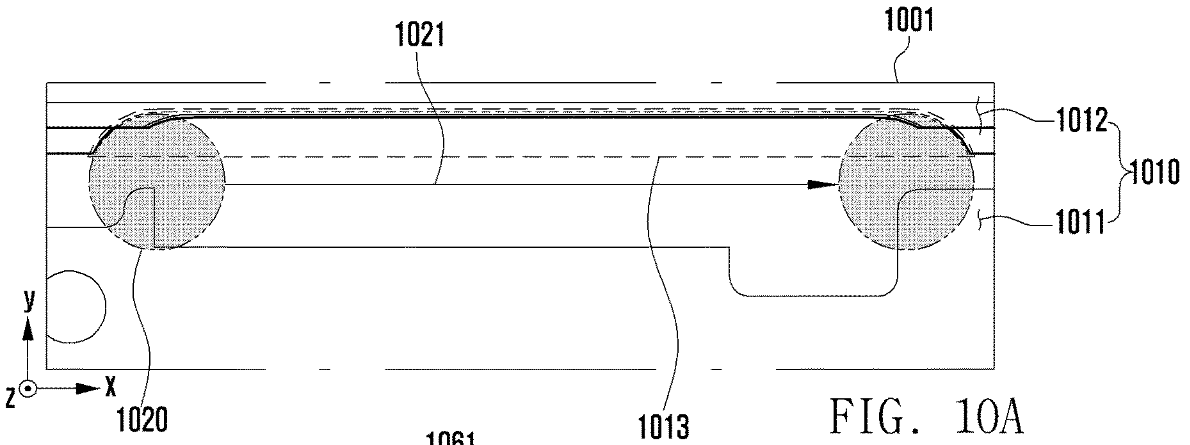
FIG. 10A is a diagram illustrating a manufacturing flow related to a case, according to an embodiment.
Figure 10B:
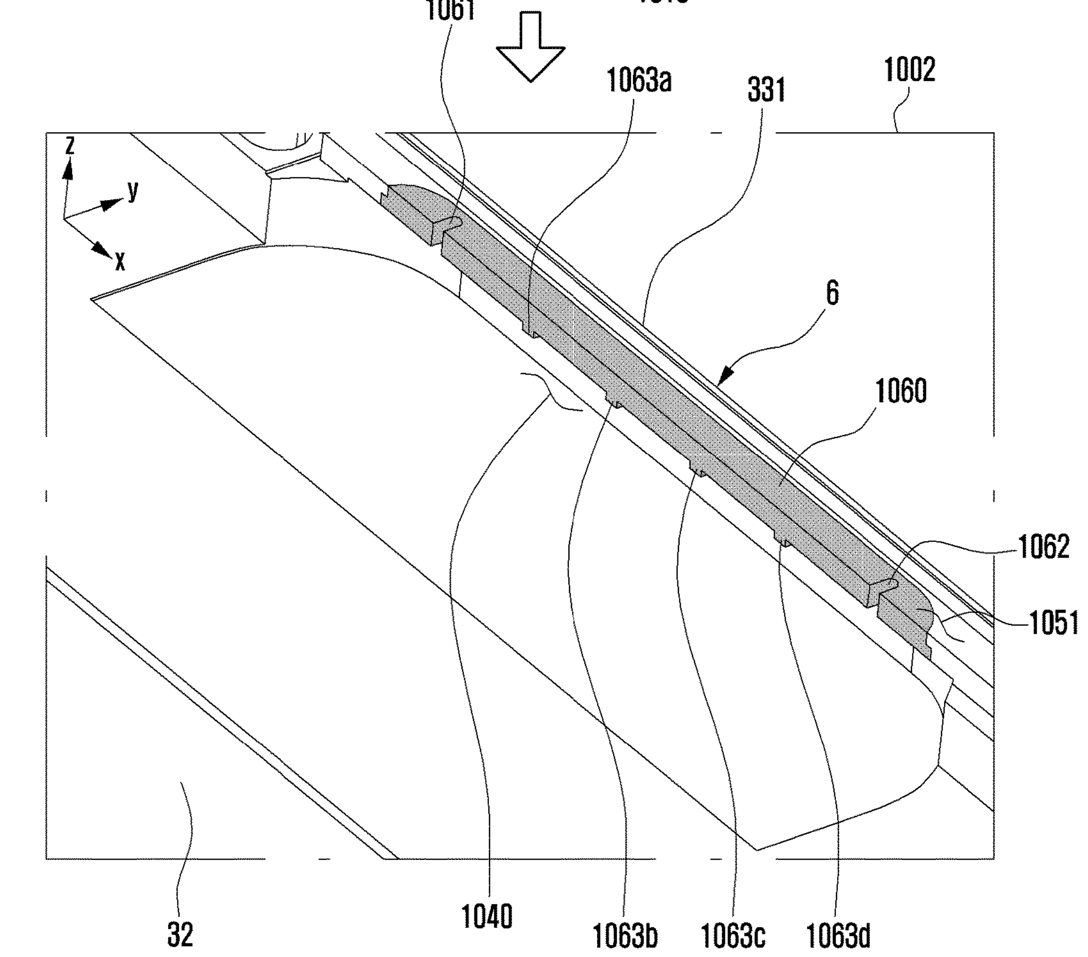
FIG. 10B illustrates the manufacturing flow of FIG. 10A after an operation according to an embodiment.

FIGS. 10A and 10B are diagrams illustrating a manufacturing flow related to a case 6, according to an embodiment.

With reference to a reference numeral '1001' of FIG. 10A, a metal structure 1010 manufactured using various processing methods such as CNC, die casting, or pressing may be externally machined using a tool 1020. The metal structure 1010 may be a base metal for forming the conductive structure 61 (see FIG. 5) included in the case 6 (see FIG. 5). A part of the metal structure 1010 shown may include, for example, a rear structure 1011 for the rear plate 32 of the case 6 (see FIG. 5), and a first side structure 1012 for the first sidewall 331 of the case 6. The tool 1020 may be, for example, a cutter with a circular radius. By moving the tool 1020 as indicated by a reference numeral '1021', an inner portion of the first side structure 1012 (refer to the area indicated by a reference numeral '1013') may be removed.

With reference to a reference numeral '1002' of FIG. 10B, the case 6 including the conductive structure 61 (see FIG. 5) and the non-conductive structure 62 (see FIG. 5) may be formed through the insert-injection molding after external machining of the metal structure 1010. FIGS. 10A and 10B only schematically shows the manufacturing flow of the case 6, and various other processes such as surface treatment may be performed.

According to an embodiment, the case 6 may include a recess 1040 in which the antenna module assembly 7 can be located. The recess 1040 may have, for example, a recessed space in the first sidewall 331. The first sidewall 331 of the case 6 may include a first connection portion 1051 to which, in the second area B02 (see FIG. 5) of the bezel area B included in the front plate 31, a portion corresponding to the first sidewall 331 is coupled. Although not shown, the second sidewall 332 of the case 6 shown in FIG. 5 may similarly include a second connection portion to which, in the second area B02 of the bezel area B included in the front plate 31, a portion corresponding to the second sidewall 332 is coupled. Although not shown, the third sidewall 333 of the case 6 shown in FIG. 5 may similarly include a third connection portion to which, in the second area B02 of the bezel area B included in the front plate 31, a portion corresponding to the third sidewall 333 is coupled. Although not shown, the fourth sidewall 334 of the case 6 shown in FIG. 5 may similarly include a fourth connection portion to which, in the second area B02 of the bezel area B included in the front plate 31, a portion corresponding to the fourth sidewall 334 is coupled.

The case 6 may have an annular connection portion including the first connection portion 1051, the second connection portion, the third connection portion, and the fourth connection portion. The annular connection portion may be formed along the edge of the front plate 31 and may overlap with the front plate 31 when viewed from above the front plate 31 (e.g., when viewed in the negative z-axis direction). The second area B02 of the bezel area B may be combined with the annular connection portion. An adhesive material such as a heat-reactive adhesive material, a photo-reactive adhesive material, a general adhesive, or a double-sided tape may be positioned between the second area B02 of the bezel area B2 and the annular connection portion. In an embodiment, a part of the non-conductive structure 62 (see FIG. 5) may include a non-conductive portion 1060 located in the first connection portion 1051. The non-conductive portion 1060 may be a part that defines the recess 1040.

According to an embodiment, the non-conductive portion 1060 may have a first groove (e.g., a first notch) 1061 into which the first insert 901 (see FIG. 8 or 9) of the support member 9 can be inserted. The non-conductive portion 1060 may have a second groove (e.g., a second notch) 1062 into which the second insert 902 (see FIG. 8 or 9) of the support member 9 can be inserted. The first insert 901 and the corresponding first groove 1061 and the second insert 902 and the corresponding second groove 1062 may be used to guide the location of the support member 9 on which the antenna structure 81 is disposed, when the support member 9 is positioned in the case 6. The first insert 901 and the corresponding first groove 1061 and the second insert 902 and the corresponding second groove 1062 may contribute for the support member 9, on which the antenna structure 81 is disposed, to be stably placed at a designated position of the case 6.

The first insert 901 of the support member 9 may have a curved bent end for forming the hemming structure, and the curved bent end may reduce interference with the first groove 1061 and thereby contribute to smooth insertion into the first groove 1061. The second insert 902 of the support member 9 may have a curved bent end for forming the hemming structure, and the curved bent end may reduce interference with the second groove 1062 and thereby contribute to smooth insertion into the second groove 1062. The first insert 901 of the support member 9 may have elasticity by the bent end for forming the hemming structure and can be resiliently inserted into the first groove 1061, which can contribute to a coupling force between the first insert 901 and the first groove 1061. The second insert 902 of the support member 9 may have elasticity by the bent end for forming the hemming structure and can be resiliently inserted into the second groove 1062, which can contribute to a coupling force between the second insert 902 and the second groove 1062.

According to an embodiment, the non-conductive portion 1060 may include a plurality of support ribs (or ribs, protrusions, support protrusions, or support portions) 1063*a*, 1063*b*, 1063*c*, and 1063*d* protruding and extending toward the first surface 801 (see FIG. 8 or 9) of the antenna structure 81 disposed on the support member 9. The plurality of support ribs 1063*a*, 1063*b*, 1063*c*, and 1063*d* may be in contact with the first surface 801 of the antenna structure 81. The plurality of support ribs 1063*a*, 1063*b*, 1063*c*, and 1063*d* may contribute so that a part other than the plurality of support ribs 1063*a*, 1063*b*, 1063*c*, and 1063*d* in the non-conductive portion 1060 can be positioned to be spaced apart from the antenna structure 81 or the first surface 801 of the antenna structure 81. The plurality of support ribs 1063*a*, 1063*b*, 1063*c*, and 1063*d* may contribute to stably positioning the antenna module assembly 7 (see FIG. 8) in the case 6. For example, the plurality of support ribs 1063*a*, 1063*b*, 1063*c*, and 1063*d* may contribute for the first surface 801 of the antenna structure 81 to be stably positioned substantially toward the positive z-axis direction without distortion (or tilt or deviation). At least one of the number, positions, and/or shapes of the plurality of support ribs 1063*a*, 1063*b*, 1063*c*, and 1063*d* may vary without being limited to the illustrated example.

Figure 11:
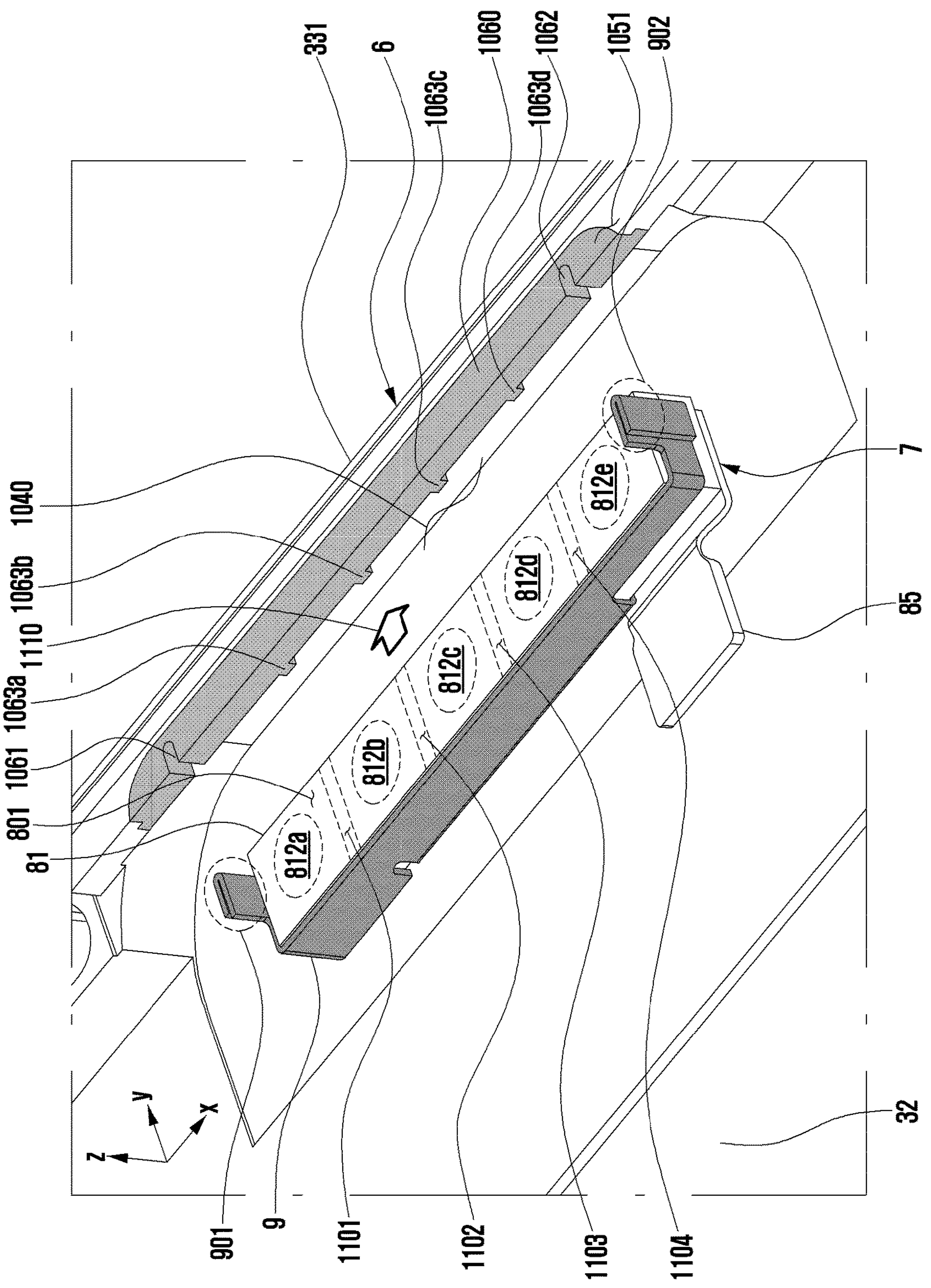
FIG. 11 is a perspective view illustrating a state in which an antenna module assembly is separated from a case, according to an embodiment.
Figure 12:
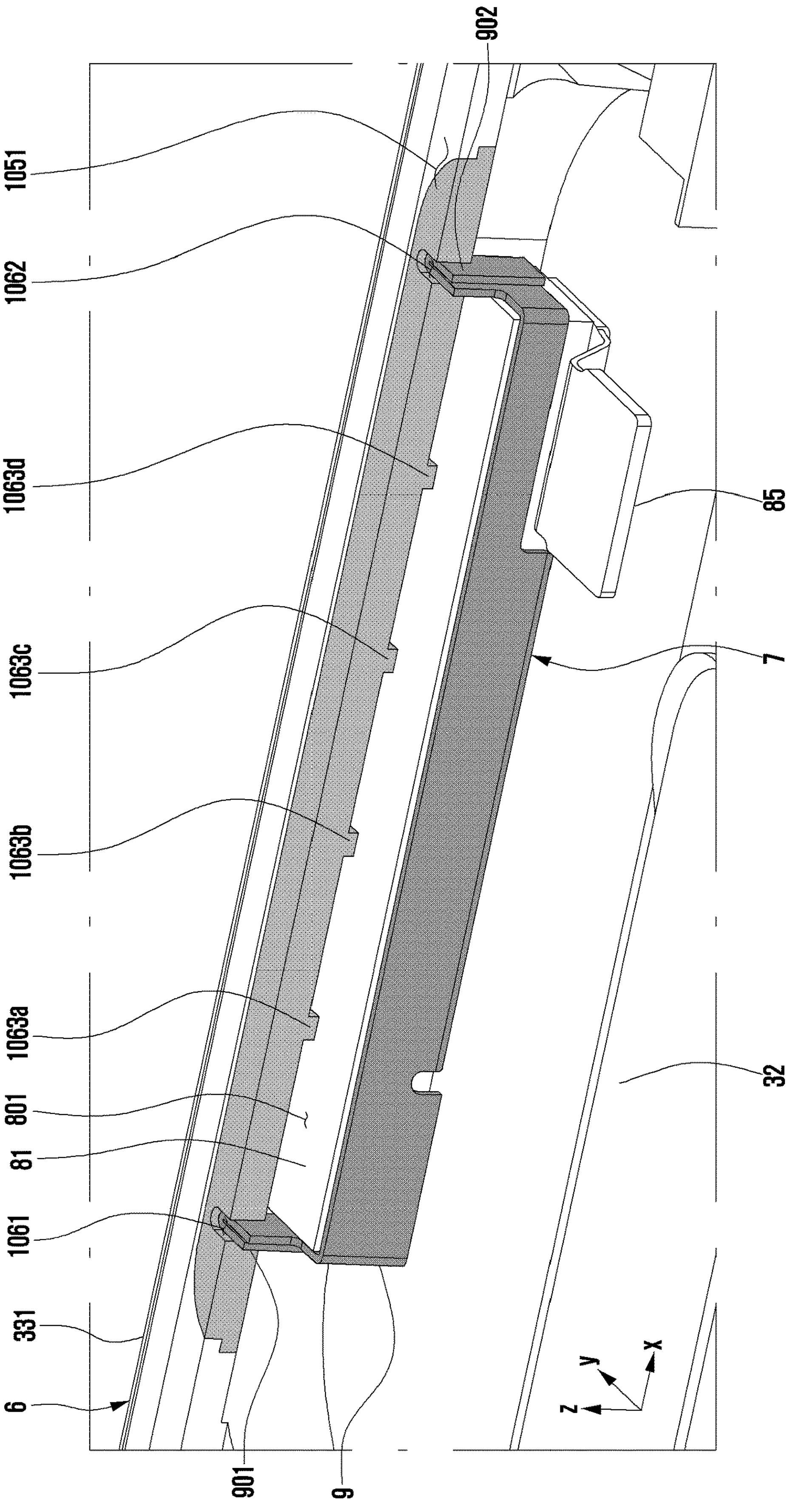
FIG. 12 is a perspective view illustrating a state in which an antenna module assembly is combined with a case, according to an embodiment.
Figure 13:
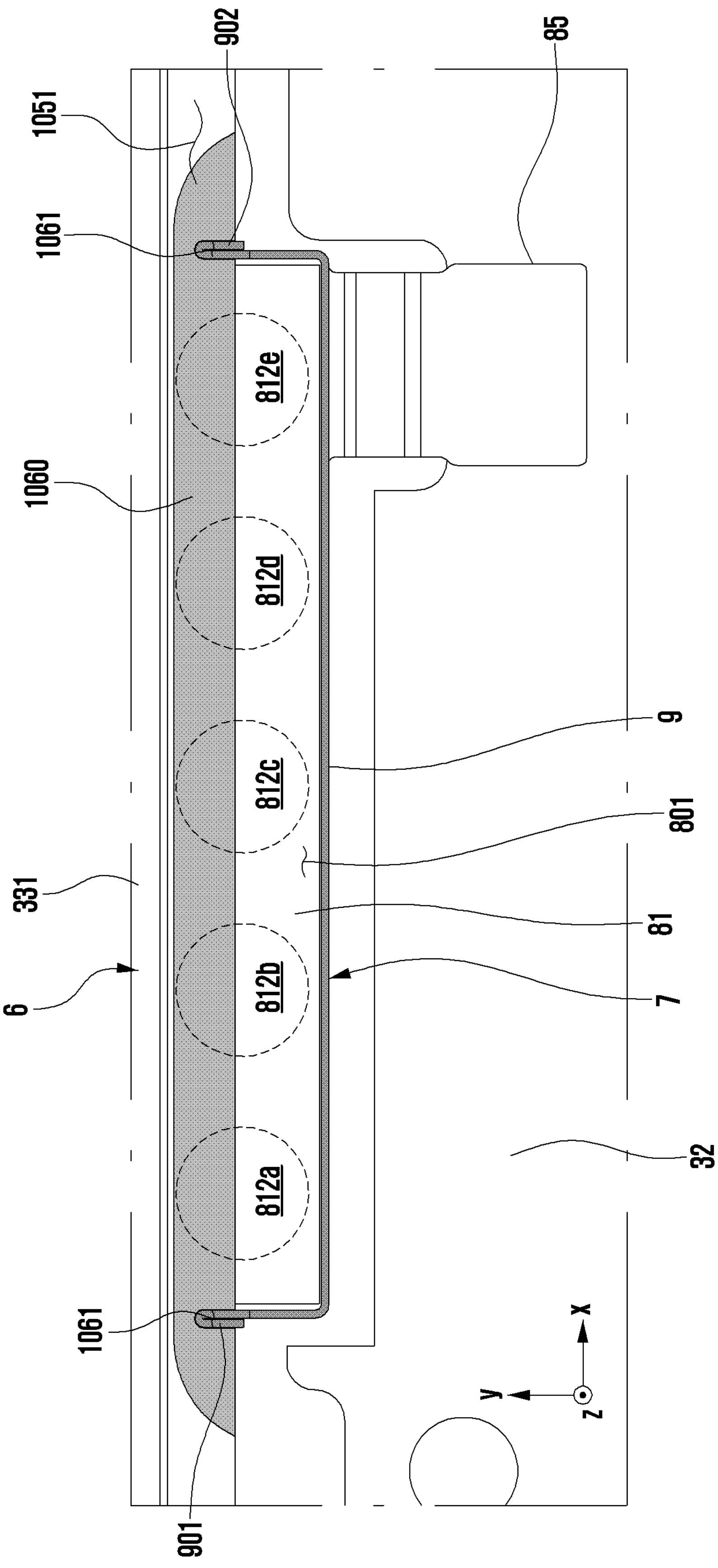
FIG. 13 is a diagram illustrating a state in which an antenna module assembly is combined with a case, according to an embodiment.

FIG. 11 is a perspective view illustrating a state in which an antenna module assembly 7 is separated from a case 6, according to an embodiment. FIG. 12 is a perspective view illustrating a state in which an antenna module assembly 7 is combined with a case 6, according to an embodiment. FIG. 13 is a diagram illustrating a state in which an antenna module assembly 7 is combined with a case 6, according to an embodiment.

With reference to FIGS. 11, 12, and 13, the antenna structure 81 and the support member 9 on which the antenna structure 81 is disposed can be moved in an insertion direction (e.g., the positive y-axis direction) indicated by a reference numeral '1110', be inserted into the recess 1040 of the case 6, and be positioned in the case 6. This disposing scheme may be referred to as sliding assembly, for example.

According to an embodiment, when viewed from above the first surface 801 (e.g., when viewed in the negative z-axis direction), the first surface 801 of the antenna structure 81 may overlap in part with the non-conductive portion 1060 included in the first connection portion 1051 of the case 6. When viewed from above the first surface 801, the plurality of antenna elements 812*a*, 812*b*, 812*c*, 812*d*, and 812*e* included in the antenna structure 81 may overlap at least in part with the non-conductive portion 1060. When viewed from above the first surface 801, the plurality of antenna elements 812*a*, 812*b*, 812*c*, 812*d* and 812*e* included in the antenna structure 81 may not overlap with a conductive portion of the case 6 (e.g., a conductive portion, for example, connected to the non-conductive portion 1060, included in the first connection portion 1051). The non-conductive portion 1060 may contribute to securing coverage while reducing the radiation performance of the antenna structure 81 from being deteriorated by the first connection portion 1051. The non-conductive portion 1060 may contribute to securing an area for combining with the front plate 31 (see FIG. 5) in the first connection portion 1051 and securing the radiation performance of the antenna structure 81.

According to an embodiment, the remaining part of the non-conductive portion 1060 except for the plurality of support ribs 1063*a*, 1063*b*, 1063*c*, and 1063*d* may contribute to be spaced apart from the first surface 801 of the antenna structure 81. When viewed from above the first surface 801 (e.g., when viewed in the negative z-axis direction), the plurality of antenna elements 812*a*, 812*b*, 812*c*, 812*d*, and 812*e* may overlap at least in part with the remaining part of the non-conductive portion 1060 except for the plurality of support ribs 1063*a*, 1063*b*, 1063*c*, and 1063*d*. An air gap may be formed between the antenna structure 81 (or the first surface 801) and the remaining part of the non-conductive portion 1060 except for the plurality of support ribs 1063*a*, 1063*b*, 1063*c*, and 1063*d*. The air gap may make it possible to reduce deformation or distortion of a beam pattern formed from the antenna structure 81 or secure coverage (communication range) toward the bezel area B (see FIG. 3 or 5) of the front plate 31. The antenna structure 81 may have directivity capable of concentrating electromagnetic wave energy or transmitting/receiving a wave in a specific direction. For example, by the beamforming system, the antenna array 812 (see FIG. 6) including the plurality of antenna elements 812*a*, 812*b*, 812*c*, 812*d*, and 812*e* may form a beam that emits a relatively high amount of energy in a direction (e.g., in the positive z-axis direction) that the first surface 801 faces. The air gap may contribute to ensure the radiation performance of the antenna structure 81 at a used frequency.

According to an embodiment, when viewed from above the first surface 801 of the antenna structure 81 (e.g., when viewed in the negative z-axis direction), the plurality of support ribs 1063*a*, 1063*b*, 1063*c*, and 1063*d* included in the non-conductive portion 1060 may be in contact with regions 1101, 1102, 1103, and 1104 of the first surface 801 that do not overlap with the plurality of antenna elements 812*a*, 812*b*, 812*c*, 812*d*, and 812*e*. For example, when viewed from above the first surface 801, the first support rib 1063*a* may contact and support the region 1101 between the first antenna element 812*a* and the second antenna element 812*b*. For example, when viewed from above the first surface 801, the second support rib 1063*b* may contact and support the region 1102 between the second antenna element 812*b* and the third antenna element 812*c*. For example, when viewed from above the first surface 801, the third support rib 1063*c* may contact and support the region 1103 between the third antenna element 812*c* and the fourth antenna element 812*d*. For example, when viewed from above the first surface 801, the fourth support rib 1063*d* may contact and support the region 1103 between the fourth antenna element 812*d* and the fifth antenna element 812*e*. When viewed from above the first surface 801, the plurality of support ribs 1063*a*, 1063*b*, 1063*c*, and 1063*d* included in the non-conductive portion 1060 may not overlap with the plurality of antenna elements 812*a*, 812*b*, 812*c*, 812*d*, and 812*e*. A structure in which the plurality of support ribs 1063*a*, 1063*b*, 1063*c*, and 1063*d* support the antenna structure 81 without overlapping with the plurality of antenna elements 812*a*, 812*b*, 812*c*, 812*d*, and 812*e* when viewed from above the first surface 801 can allow the antenna structure 81 to be stably positioned in the case 6 while also reducing the radiation performance degradiation of the antenna structure 81. The support ribs 1063*a*, 1063*b*, 1063*c*, and 1063*d* of the non-conductive portion 1060 are not limited to the illustrated example, and may be formed in other various shapes that do not overlap with the plurality of antenna elements 812*a*, 812*b*, 812*c*, 812*d*, and 812*e*. For example, the support ribs 1063*a*, 1063*b*, 1063*c*, and 1063*d* of the non-conductive portion 1060 can have a bell or hourglass shape which is wider towards one or both of the sides S1 and S2 than along a centerline of the antenna array 812.

According to some embodiments, the plurality of support ribs 1063*a*, 1063*b*, 1063*c*, and 1063*d* may be omitted, and in this case, the entire non-conductive portion 1060 may be located to be spaced apart from the antenna structure 81 or the first surface 801 of the antenna structure 81.

Figure 14:
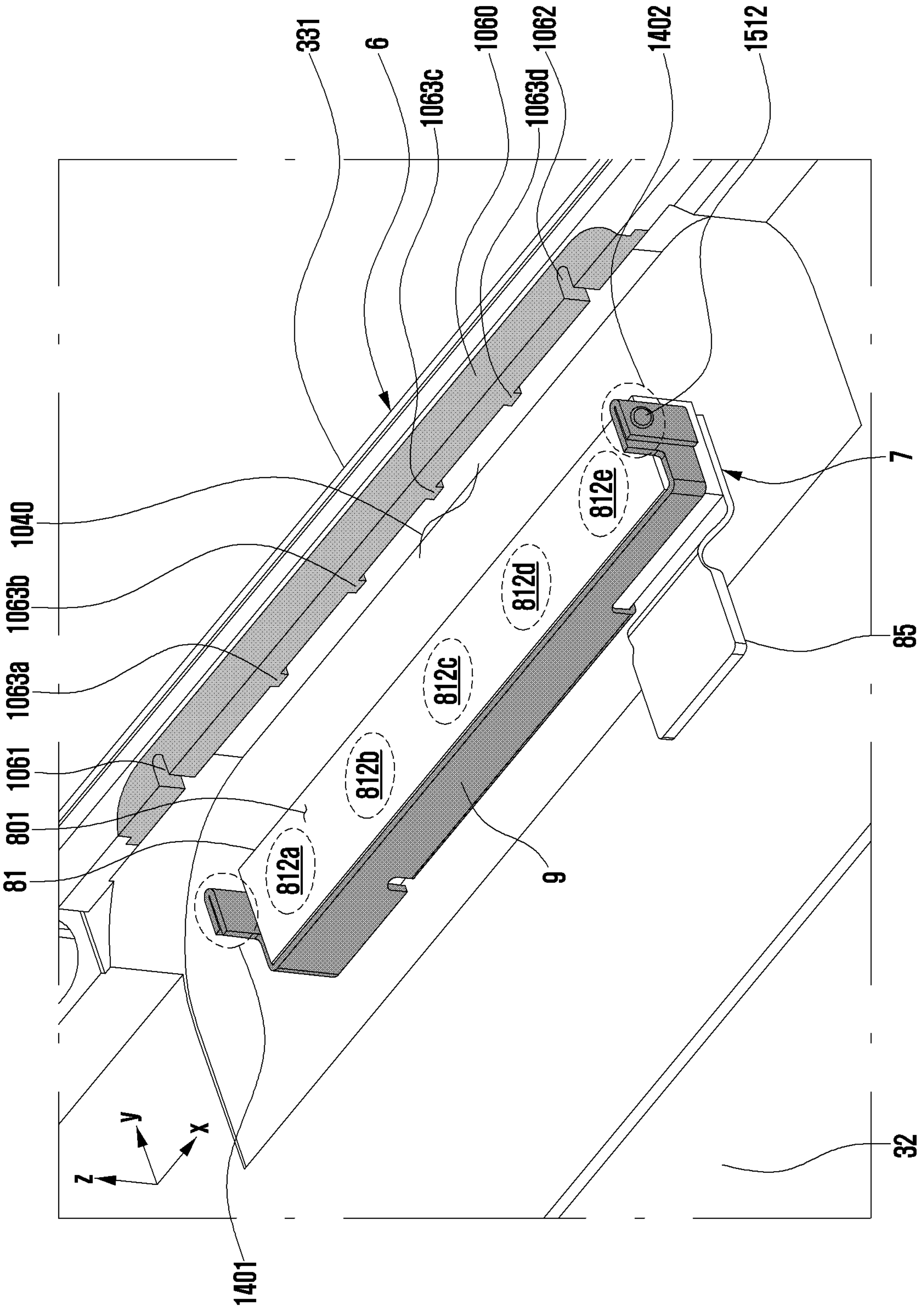
FIG. 14 is a perspective view illustrating a state in which an antenna module assembly is separated from a case, according to various embodiments.
Figures 15A, 15B:
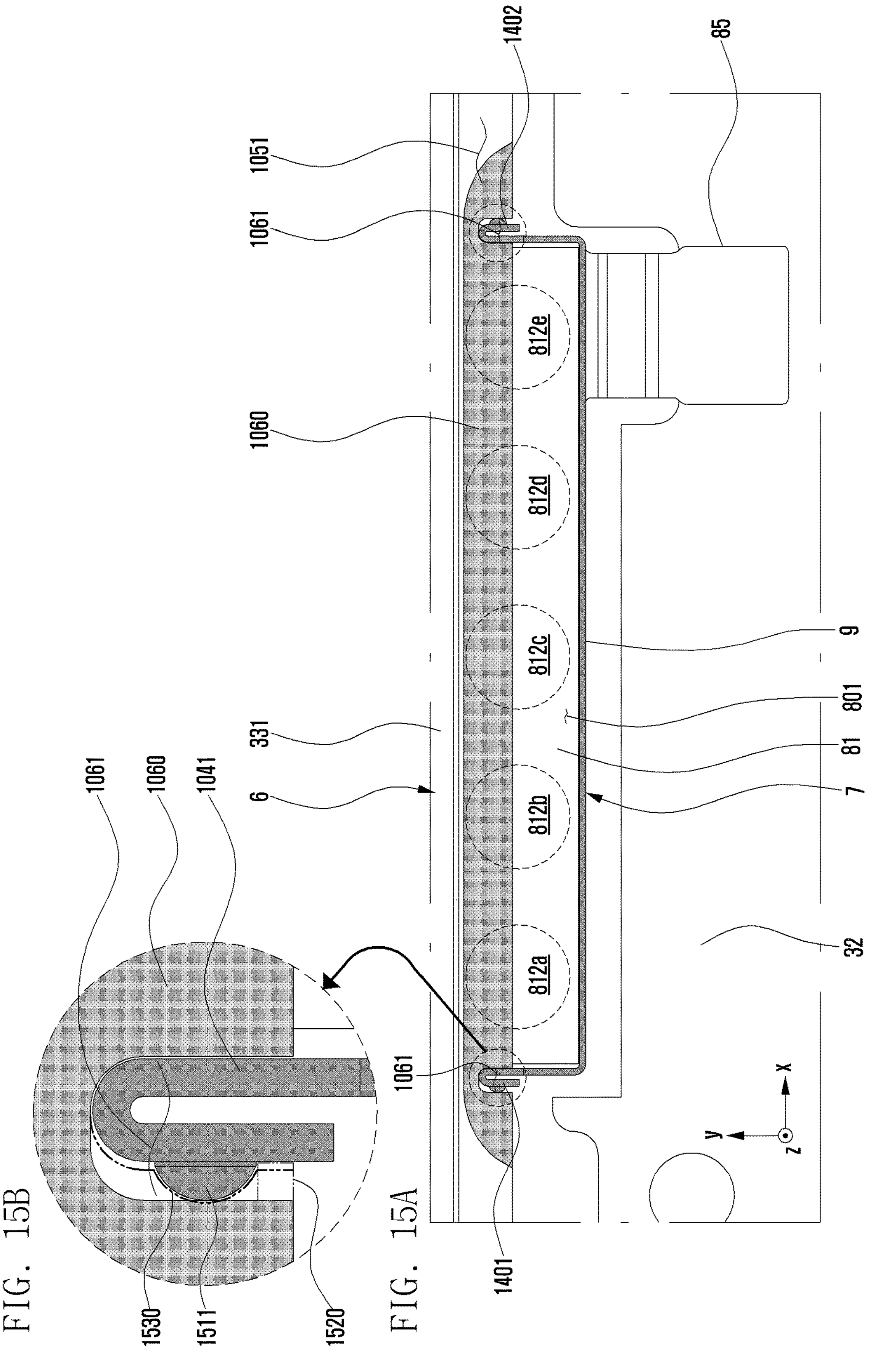
FIG. 15A is a diagram illustrating a state in which an antenna module assembly is combined with a case, according to various embodiments.
FIG. 15B is an expanded view of a portion of FIG. 15A according to various embodiments.

FIG. 14 is a perspective view illustrating a state in which an antenna module assembly 7 is separated from a case 6, according to various embodiments. FIG. 15 is a diagram illustrating a state in which an antenna module assembly 7 is combined with a case 6, according to various embodiments.

With reference to FIGS. 14 and 15, the support member 9 on which the antenna structure 81 of the antenna module assembly 7 is disposed may include a first insert 1401 and a second insert 1402 respectively inserted into the first groove 1061 and the second groove 1062 of the non-conductive portion 1060 included in the first connection portion 1051 of the case 6. In an embodiment, the first insert 1401 is a modification of the first insert 901 according to the example of FIG. 9 and may include a first convex portion 1511 included in the hemming structure. The first insert 1401 may have elasticity by the bent end for forming the hemming structure, and when the first insert 1401 is elastically inserted into the first groove 1061, the first convex portion 1511 may contribute to the coupling force between the first insert 1401 and the first groove 1061. The second insert 1402 may include a second convex portion 1512 included in the hemming structure in substantially the same manner as the first insert 1401.

According to some embodiments, the non-conductive portion 1060 may include a first locking portion 1520 for hook fastening to the first insert 1401 including the first convex portion 1511 as shown with an imaginary line indicated by a reference numeral '1520'. For example, the first insert 1401 may be elastically inserted into the first groove 1061 because of the hemming structure, and the interference between the first locking portion 1520 and the first convex portion 1511 may reduce a phenomenon that the first insert 1401 is separated from the first groove 1061. The first convex portion 1511 may be formed, for example, in a convex shape having a curved surface so that the first insert 1401 can be smoothly inserted into or separated from the first groove 1061. Although not shown, the non-conductive portion 1060 may include a second locking portion corresponding to the second convex portion 1512 of the second insert 1402 in substantially the same manner as the first locking portion 1520 corresponding to the first convex portion 1511.

According to some embodiments, the first groove 1061 may have a first recess for positioning the first convex portion 1511 in a portion corresponding to the first convex portion 1511 as indicated by a reference numeral '1530'. For example, the first insert 1401 may be elastically inserted into the first groove 1061 because of the hemming structure, and positioning the first convex portion 1511 in the first recess 1530 can reduce a phenomenon that the first insert 1401 is separated from the first groove 1061. Although not shown, in substantially the same manner as the first recess 1530 formed in the first groove 1061 to correspond to the first convex portion 1511, the second groove 1062 may have a second recess corresponding to the second convex portion 1512 of the second insert 1402. The first convex portion 1511 and the corresponding first recess 1530 may contribute to allowing the first insert 1401 to be placed at a designated position of the first groove 1061, and the second convex portion 1512 and the corresponding second recess may contribute to allowing the second insert 1402 to be placed at a designated position of the second groove 1062.

Figure 16:
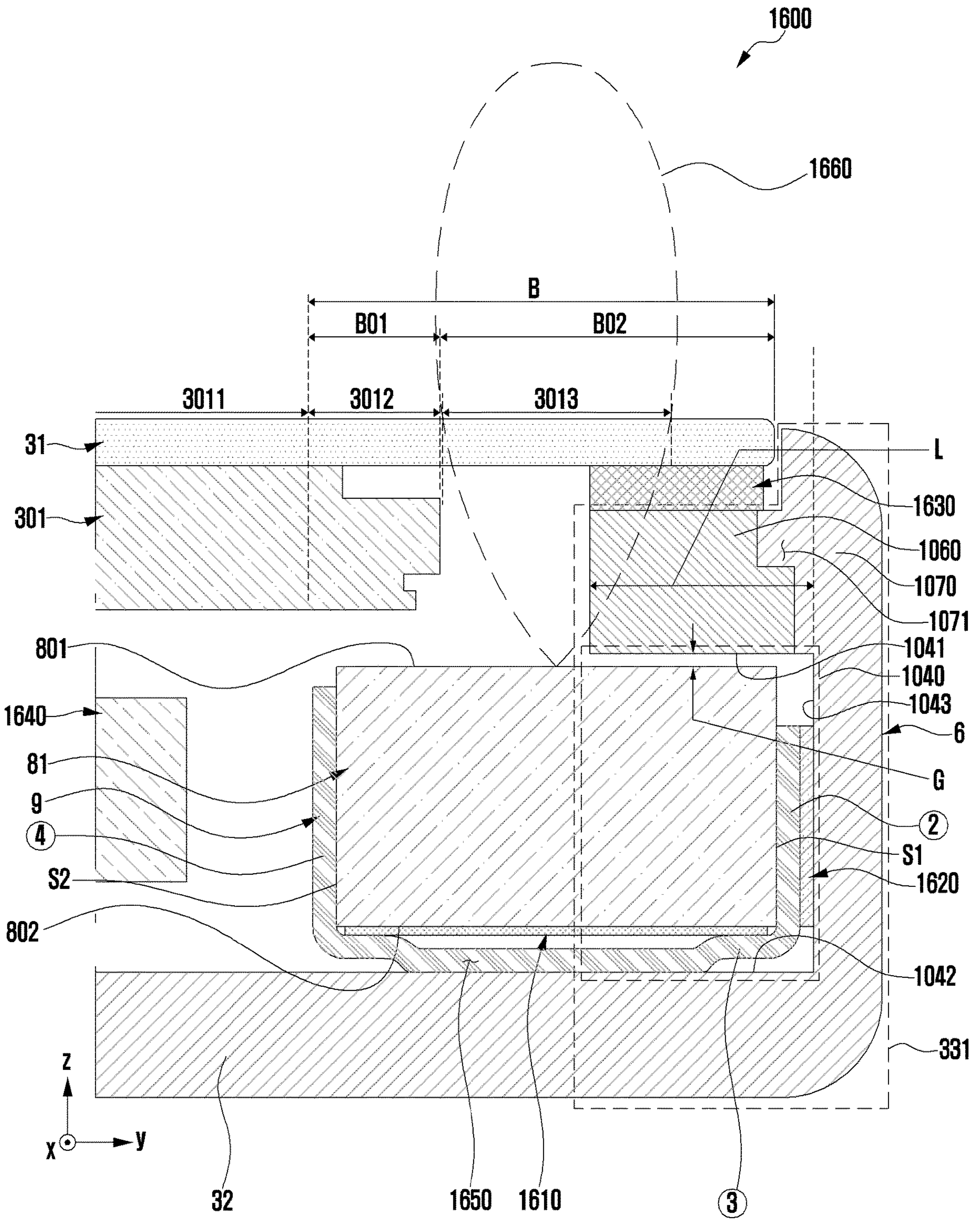
FIG. 16 is a cross-sectional view of an electronic device taken along line D-D' in FIG. 3, according to an embodiment.

FIG. 16 is a cross-sectional view 1600 of an electronic device 3 taken along line D-D' in FIG. 3, according to an embodiment.

With reference to FIG. 16, the electronic device 3 may include the front plate 31, the case 6, the display 301, the antenna structure 81, the support member 9, a first adhesive member 1610, a second adhesive member 1620, a third adhesive member 1630, and/or a printed circuit board 1640.

According to an embodiment, the first adhesive member 1610 may be located between the third support portion ③ of the support member 9 and the second surface 802 of the antenna structure 81. The first adhesive member 1610 may contribute to stable combination of the antenna structure 81 and the support member 9.

According to an embodiment, the second support portion ② of the support member 9 may be combined with a surface corresponding to (or facing) the second support portion ② among surfaces forming the recess 1040 of the case 6 through the second adhesive member 1620. In some embodiments, the second support portion ② of the support member 9 may be combined with the case 6 through a mechanical fastening element such as a screw. The combination of the second support portion ② and the case 6 may contribute for the support member 9, on which the antenna structure 81 is disposed, to be stably positioned in the case 6. For example, the combination of the second support portion ② and the case 6 may contribute for the first surface 801 of the antenna structure 81 to be stably formed substantially toward the positive z-axis direction without distortion (or tilt or deviation).

According to an embodiment, the third support portion ③ of the support member 9 may be supported by the rear plate 32 of the case 6. The rear plate 32 may support the support member 9 in the positive z-axis direction (e.g., vertical support). The structure in which the rear plate 32 supports the third support portion ③ of the support member 9 may contribute to ensure that the support member 9 on which the antenna structure 81 is disposed can be stably positioned in the case 6. For example, the structure in which the rear plate 32 supports the third support portion ③ of the support member 9 may contribute for the first surface 801 of the antenna structure 81 to be stably formed substantially toward the positive z-axis direction without distortion (or tilt or deviation).

According to an embodiment, the third support portion ③ of the support member 9 may include a convex structure (hereinafter, referred to as a convex structure 1650) protruding toward the rear plate 32. The convex structure 1650 may be supported by the rear plate 32. In some embodiments, the third support portion ③ may be formed without the convex structure 1650, and in this case, the rear plate 32 may include a convex structure for supporting the third support portion ③, or a separate support member may be positioned between the third support portion ③ and the rear plate 32.

According to some embodiments, an adhesive material (not separately illustrated) may be positioned between the rear plate 32 and the third support portion ③ of the support member 9. In some embodiments, a flexible member (not separately illustrated) such as rubber may be positioned between the rear plate 32 and the third support portion ③ of the support member 9. The adhesive material or flexible member between the rear plate 32 and the third support portion ③ of the support member 9 may reduce the effect of stress on the antenna module assembly 7 (see FIG. 8) or the effect of stress on the coupling structure between the support member 9 and the case 6 when an external impact is applied to the housing 30 (see FIG. 3).

According to an embodiment, when viewed from above the front plate 31 (e.g., when viewed in the negative z-axis direction), the display 301 may include the border area 3012 that overlaps in part with the bezel area B. The bezel area B shown in the cross-sectional view 1600 of FIG. 16 may indicate the first bezel area B1 (see FIG. 3). When viewed from above the front plate 31, the bezel area B may include the first area B01 that overlaps with the border area 3012 of the display 301, and the second area B02 that does not overlap with the border area 3012 of the display 301 (see FIG. 5). The second area B02 may be formed in an annular shape surrounding the first area B01 when viewed from above the front plate 31. In an embodiment, the antenna structure 81 may be inserted into the recess (or recess structure) 1040 formed in the case 6 by using the support member 9. The recess 1040 may have, for example, a recessed space in the first sidewall 331. The structure in which the antenna structure 81 is located in the recess 1040 of the case 6 by using the support member 9 may contribute not to overlap the display area 3011 with the antenna structure 81, the first surface 801 of the antenna structure 81, or the antenna array 812 (see FIG. 8) of the antenna structure 81 when viewed from above the front plate 31. The structure in which the antenna structure 81 is located in the recess 1040 of the case 6 by using the support member 9 may contribute to overlap the antenna array 812 (see FIG. 8) of the antenna structure 81 with the second area B02 among the first area B01 and the second area B02 of the bezel area B when viewed from above the front plate 31. The third adhesive member 1630 may be located between the second area B02 of the bezel area B included in the front plate 31 and a sidewall of the case 6 (e.g., the first sidewall 331 in the illustrated cross-sectional view 1600).

According to an embodiment, in the illustrated cross-sectional view 1600, the surface forming the recess 1040 may include a third surface 1041, a fourth surface 1042, and a fifth surface 1043. The third surface 1041 may face the first surface 801 of the antenna structure 81. The third surface 1041 may have, for example, a non-conductive area formed by the non-conductive portion 1060 of the first sidewall 331, and a conductive area formed by the conductive portion 1070 of the first sidewall 331. The conductive portion 1070 may form at least in part the side surface 30C (see FIG. 3) of the electronic device 3. The fourth surface 1042 may be positioned opposite to the third surface 1041 and may face the third support portion ③ of the support member 9. For example, the fourth surface 1042 may have a conductive area formed by the conductive portion 1070 of the first sidewall 331. The fifth surface 1043 may be combined with the second support portion ② of the support member 9 through the second adhesive member 1620. For example, the fifth surface 1043 may have a conductive area formed by the conductive portion 1070 of the first sidewall 331. In some embodiments, at least a part of the fourth surface 1042 or fifth surface 1043 may have a non-conductive area formed by the non-conductive portion of the first sidewall 331.

According to an embodiment, the plurality of support ribs 1063*a*, 1063*b*, 1063*c*, and 1063*d* (see FIG. 11, 12, or 14) may protrude and extend from the third surface 1041 of the recess 1040. The third surface 1041 may be substantially parallel with the first surface 801, for example. In some embodiments, the third surface 1041 may have a surface including an inclined surface, a curved surface, or an uneven surface, which is not parallel with the first surface 801. Hereinafter, surfaces of the plurality of support ribs 1063*a*, 1063*b*, 1063*c*, and 1063*d* will be described separately from the third surface 1041. In some embodiments, the surfaces of the plurality of support ribs 1063*a*, 1063*b*, 1063*c*, and 1063*d* may be defined as parts of the third surface 1041, and in this case, the third surface 1041 may be referred to as a surface having an unevenness.

According to an embodiment, when viewed from above the front plate 31 (e.g., when viewed in the negative z-axis direction), a conductive area formed by the conductive portion 1070 of the first sidewall 331 in the third surface 1041 of the recess 1040 may not overlap with the first surface 801 of the antenna structure 81 or the antenna array 812 (see FIG. 8). In some embodiments, when viewed from above the front plate 31, the conductive area formed by the conductive portion 1070 of the first sidewall 331 in the third surface 1041 may overlap in part with the first surface 801 of the antenna structure 81, but may not overlap with the antenna array 812 of the antenna structure 81. When viewed from above the front plate 31, the first surface 801 of the antenna structure 81 may have a third area and a fourth area with respect to the antenna array 812. The antenna array 812 may be positioned between the third area and the fourth area. The third area may be connected to the first side surface S1 of the antenna structure 81, and the fourth area may be connected to the second side surface S2 of the antenna structure 81. In an embodiment, when viewed from above the front plate 31, the conductive area formed by the conductive portion 1070 of the first sidewall 331 in the third surface 1041 may overlap with the third area, but may not overlap with the antenna array 812 of the antenna structure 81. A width L at which the third surface 1041 extends in the y-axis direction may be, for example, one of about 2 mm to about 3 mm, but it is not limited thereto and may vary.

According to an embodiment, a part 1071 of the conductive portion 1070 included in the first sidewall 331 may be positioned toward the front plate 31 with respect to the first surface 801 of the antenna structure 81 and connected to the non-conductive portion 1060. When viewed from above the front plate 31 (e.g., when viewed in the negative z-axis direction), the part 1071 of the conductive portion 1070 included in the first sidewall 331 may not overlap with the antenna array 812 (see FIG. 8) of the antenna structure 81. In some embodiments, when viewed from above the front plate 31, the part 1071 of the conductive portion 1070 included in the first sidewall 331 may overlap with a part (e.g., the third area) of the first surface 801 of the antenna structure 81, but may not overlap with the antenna array 812 of the antenna structure 81. In some embodiments, when viewed from above the front plate 31, the part 1071 of the conductive portion 1070 included in the first sidewall 331 may not overlap with the first surface 801 of the antenna structure 81.

According to some embodiments, the entire third surface 1041 of the recess 1040 may be formed by the non-conductive portion 1060.

According to an embodiment, the non-conductive portion 1060 of the first sidewall 331 may be positioned at least in part between the first surface 801 of the antenna structure 81 and the second area B02 of the bezel area B. The non-conductive portion 1060 may be utilized as a part of an area of the case 6 for combining with the front plate 31. For example, a part of the third adhesive member 1630 (e.g., an annular adhesive member) connecting the case 6 and the front plate 31 may be located between the non-conductive portion 1060 and the second area B02 of the bezel area B.

According to an embodiment, by the beamforming system, the antenna structure 81 may form a beam pattern (or antenna radiation pattern) composed of beams (or lobes) formed by the plurality of antenna elements 812*a*, 812*b*, 812*c*, 812*d*, and 812*e* (see FIG. 8) of the antenna array 812. The beam pattern is an effective area in which the antenna array 812 can radiate or sense electromagnetic waves, and it can be formed by combining the radiation powers of the plurality of antenna elements 812*a*, 812*b*, 812*c*, 812*d*, and 812*e* of the antenna array 812. The beam pattern may include a main beam (or main lobe) 1660 in the maximum radiation direction (boresight). For example, the main beam 1660 indicates a beam in which a relatively large amount of energy is radiated, and the antenna structure 81 may transmit and/or receive a frequency signal substantially through the main beam 1660. In an embodiment, the antenna structure 81 may form the main beam 1660 in a direction (e.g., the positive z-axis direction) toward the bezel area B. When viewed in the direction in which the main beam 1660 of the antenna structure 81 is radiated, the antenna array 812 of the antenna structure 81 may overlap at least in part with the bezel area B or the second area B02 of the bezel area B.

In an embodiment, a width (e.g., a width in the y-axis direction in the illustrated example) of the second area B02 may be a value included in a range of about 2 mm to about 3 mm. When viewed in the direction in which the main beam 1660 of the antenna structure 81 is radiated, an area overlapping with the antenna array 812 in the second area B02 of the bezel area B or an area through which the main beam 1660 passes in the second area B02 of the bezel area B may be referred to as an RF window area 3013. The RF window area 3013 may not overlap with the display 301 when viewed from above the front plate 31 (e.g., when viewed in the negative z-axis direction). The RF window area 3013 may overlap in part with the non-conductive portion 1060 when viewed from above the front plate 31 or when viewed in a direction in which the main beam 1660 of the antenna structure 81 is radiated. A part of the main beam 1660 formed in the antenna structure 81 may be directed toward the non-conductive portion 1060, and the non-conductive portion 1060 may reduce the effect of the first sidewall 331 on the main beam 1660.

When viewed in a direction in which the main beam 1660 of the antenna structure 81 is radiated, the antenna array 812 (see FIG. 8) of the antenna structure 81 may overlap at least in part with the non-conductive portion 1060. In case of a comparative example in which the non-conductive portion 1060 is replaced by a conductive portion and overlaps with the antenna array 812, the conductive portion may cause the deformation or distortion of the beam pattern or block or impede the propagation of radio waves radiated from the antenna structure 81. The non-conductive portion 1060 can make it possible to secure an area for combining with the front plate 31 and also reduce deformation or distortion of the beam pattern or secure coverage (communication range) by reducing the effect of the first sidewall 331 on the radio waves radiated from the antenna structure 81.

According to an embodiment, the part 1071 of the conductive portion 1070 of the first sidewall 331 positioned toward the front plate 31 with respect to the first surface 801 of the antenna structure 81 and connected to the non-conductive portion 1060 may not overlap with the RF window area 3013 when viewed from above the front plate 31. For this reason, the effect of the conductive portion 1070 of the first sidewall 331 on the radiation performance of the antenna structure 81 may be substantially absent or insignificant to a level capable of securing the radiation performance of the antenna structure 81.

According to an embodiment, the remaining part of the non-conductive portion 1060 other than the plurality of support ribs 1063*a*, 1063*b*, 1063*c*, and 1063*d* (see FIG. 11) may be located to be spaced apart from the antenna structure 81 or the first surface 801 of the antenna structure 81. For example, an air gap G may be formed between the antenna structure 81 (or the first surface 801) and the remaining part of the non-conductive portion 1060 other than the plurality of support ribs 1063*a*, 1063*b*, 1063*c*, and 1063*d*. In case of a comparative example in which the air gap G is substantially absent or the height of the air gap G (e.g., the height in the z-axis direction) is not within a critical range, the deformation or distortion of the beam pattern formed from the antenna array 812 (see FIG. 8) may occur. In the above comparative example, the radiation performance of the antenna structure 81 may be degraded due to the dielectric constant of the non-conductive portion 1060. The deformation or distortion of the beam pattern may degrade the coverage (communication range) performance toward the front plate 31. The height of the air gap G may be formed to ensure the radiation performance of the antenna structure 81. The radio waves radiated from the antenna structure 81 toward the bezel area B (or the RF window area 3013) may include, for example, horizontal polarization and vertical polarization as dual polarization.

In case of transmitting or receiving a signal having a used frequency (e.g., about 28 GHz or about 39 GHz) using the antenna structure 81, the radiation performance for vertical polarization and/or horizontal polarization may vary according to the height of the air gap G. The height of the air gap G may be formed to secure the radiation performance in consideration of power loss (e.g., return loss) and/or antenna gain (e.g., peak gain). In the illustrated example, the air gap G may be formed as a value of about 0.1 mm to about 0.5 mm, so that the radiation performance at a used frequency can be secured. In various embodiments, the height of the air gap G for securing the radiation performance of the antenna structure 81 may be formed variously depending on at least one of a material, shape, and/or boundary condition of surrounding components corresponding to the radio waves radiated from the antenna structure 81. In some embodiments, the air gap G may be implemented to be minimized in a range of securing the radiation performance for a used frequency, thereby contributing to the slimming of the electronic device 3 (see FIG. 3).

According to an embodiment, the non-conductive portion 1060 may include various polymers such as engineering plastics (e.g., polycarbonate (PC) or polymethyl methacrylate (PMMA)). For example, the non-conductive portion 1060 may include a polymer resin such as polyether ether ketone, polyphenylene sulfide, polybutylene terephthalate, polyimide, or polycarbonate. In some embodiments, the non-conductive portion 1060 may include a material (e.g., fiber reinforced plastic (FRP)) in which various reinforcing substrates such as glass fiber or carbon fiber are mixed with engineering plastic. The non-conductive portion 1060 may have a relative permittivity of, for example, a value included between about 3.3 and about 3.7, although other relative permittivities are within the contemplated scope of this disclosure.

According to some embodiments, a non-conductive material (not shown) may be disposed between the non-conductive portion 1060 and the antenna structure 81 (or the first surface 801). The non-conductive material may have a dielectric constant that does not substantially affect the radiation performance of the antenna structure 81. In other words, the non-conductive material may have a dielectric constant that affects the radiation performance of the antenna structure 81 to the extent that it does not deteriorate below a desired level. The non-conductive material may include, for example, various adhesive materials having a low dielectric constant, and the antenna structure 81 may be coupled to the non-conductive portion 1060 through the adhesive material. The non-conductive material may include, for example, an adhesive material such as a heat-reactive adhesive material, a photo-reactive adhesive material, a general adhesive, or a double-sided tape. Because of the non-conductive material, there may be substantially no air gap between the non-conductive portion 1060 and the antenna structure 81 (or the first surface 801). In some embodiments, the non-conductive material between the non-conductive portion 1060 and the antenna structure 81 (or the first surface 801) may have a heat dissipation function.

According to an embodiment, in case that the antenna structure 81 is positioned in the recess 1040 of the case 6 by using the support member 9, compared to a comparative example where it is not, it is possible to reduce an area in which the first surface 801 of the antenna structure 81 overlaps with the display 301 when viewed from above the front plate 31 (e.g., when viewed in the negative z-axis direction). The structure in which the antenna structure 81 is located in the recess 1040 of the case 6 by using the support member 9 may contribute for the antenna array 812 (see FIG. 8) of the antenna structure 81 not to overlap with the display 301 when viewed from above the front plate 31. In an embodiment, the border area 3012 of the display 301 may be located between the bezel area B of the front plate 31 and the first surface 801 of the antenna structure 81.

In case of a comparative example in which a conductive material (e.g., a copper layer forming the rear surface of the display 301) included in the display 301 when viewed from above the front plate 31 overlaps with the antenna array 812, the conductive material included in the display 301 may cause the deformation or distortion of a beam pattern formed from the antenna array 812 of the antenna structure 81, or block or impede the propagation of radio waves radiated from the antenna structure 81. In case of this comparative example, the radio waves radiated from the antenna array 812 of the antenna structure 81 may cause a surface wave that is guided through the display 301. The display 301 is a waveguide through which radio waves radiated from the antenna array 812 of the antenna structure 81 flow, and may be, for example, a path of a medium through which radio waves flow. Although it may be set to form a beam pattern through the antenna array 812 of the antenna structure 81, the surface wave guided through the display 301 may cause the deformation (or distortion) of the beam pattern or reduce the beam coverage (communication range). At least a part of the electromagnetic field formed from the antenna array 812 of the antenna structure 81 may be reflected by the display 301, and the reflected component may compensate and/or interfere in the maximum radiation direction (e.g., the direction of the main beam 1660), thereby resulting in the deformation (or distortion) of the beam pattern.

In an embodiment, the structure in which the antenna structure 81 is located in the recess 1040 of the case 6 by using the support member 9 may contribute so that electromagnetic isolation between the display 301 and the antenna array 812 can be formed to ensure the radiation performance of the antenna structure 81. For example, based on the wavelength of the antenna structure 81, the antenna array 812 may be positioned to be spaced apart from the display 301 by a corresponding distance or more. In some embodiments, the border area 3012 of the display 301 may be implemented in a form that can reduce deterioration in the radiation performance of the antenna structure 81.

According to an embodiment, the printed circuit board 1640 may be located at least in part between the display 301 and the rear plate 32. Components such as the processor 120, the memory 130, or the communication module 190, shown in FIG. 1, may be disposed on the printed circuit board 1640. The antenna structure 81 may be electrically connected to the printed circuit board 1640 through an electrical path 85 (see FIG. 8). The printed circuit board 1640 may be referred to as a 'first printed circuit board', and the printed circuit board 811 (see FIG. 8) included in the antenna structure 81 may be referred to as a 'second printed circuit board'. When viewed from above the front plate 31 (e.g., when viewed in the negative z-axis direction), the printed circuit board 1640 may not overlap with the antenna structure 81. The fourth support portion ④ of the support member 9 may be positioned between the printed circuit board 1640 and the antenna structure 81.

According to an embodiment, the printed circuit board 1640 may be disposed on the rear plate 32 by using a mechanical fastening element (not separately illustrated) such as a screw. The rear plate 32 may have a mounting surface on which components such as the printed circuit board 1640 or a battery (e.g., the battery 189 in FIG. 1) may be disposed.

According to some embodiments, the electronic device 3 (see FIG. 3) may further include another support member (hereinafter, a bracket, not shown) extending from the sidewall of the case 6 (e.g., the first sidewall 331, the second sidewall 332, and the third sidewall 333, and/or the fourth sidewall 334). The bracket is a part on which components such as the display 301, the printed circuit board 1640, or the battery are disposed, and may contribute to the durability or rigidity (e.g., torsional rigidity) of the electronic device 3. For example, the display 301 may be disposed on one surface of the bracket facing the front plate 31, and the printed circuit board 1640 may be disposed on the other surface of the bracket facing the rear plate 32. In some embodiments, the bracket may extend between the rear plate 32 and the third support portion ③ of the support member 9, and in this case, the third support portion ③ may be supported by the bracket. In some embodiments, the third support portion ③ may be combined with the bracket by using an adhesive material or using a mechanical fastening element such as a screw. In some embodiments, the bracket may have an opening (e.g., an opening in the form of a through-hole or an opening in the form of a notch), wherein the support member 9 may be located in the opening and the third support portion ③ of the support member 9 may be supported by the rear plate 32.

Figure 17:
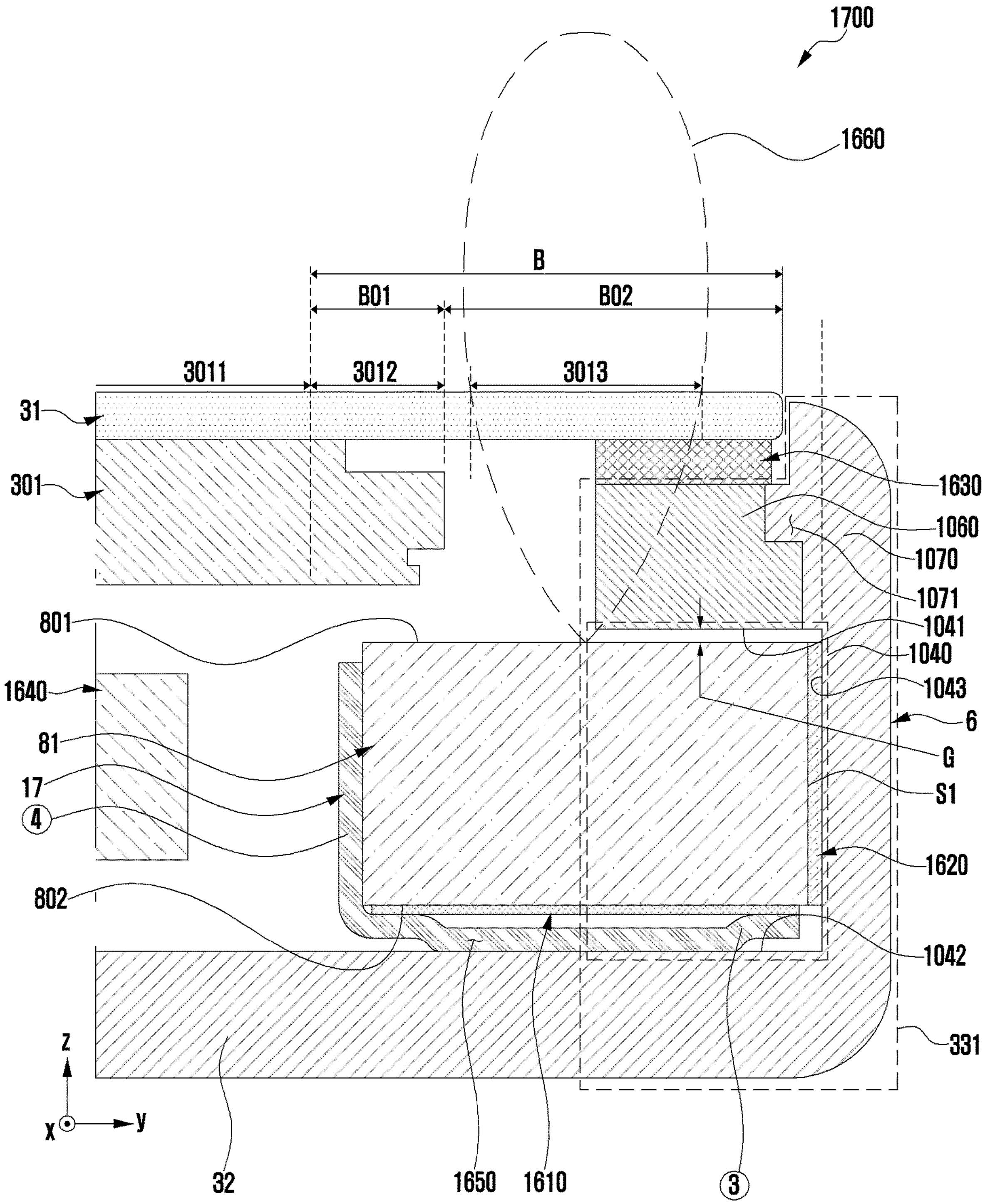
FIG. 17 is a cross-sectional view of an electronic device taken along line D-D' in FIG. 3, according to various embodiments.

FIG. 17 is a cross-sectional view 1700 of an electronic device 3 taken along line D-D' in FIG. 3, according to various embodiments.

With reference to FIG. 17, the electronic device 3 may include the front plate 31, the case 6, the display 301, the antenna structure 81, a support member 17, the first adhesive member 1610, the second adhesive member 1620, the third adhesive member 1630, and/or the printed circuit board 1640. Compared to the support member 9 according to the example of FIG. 16, the support member 17 may be implemented by omitting the second support portion ②.

In some embodiments, the first side surface S1 of the antenna structure 81 may be combined with the fifth surface 1043 of the recess 1040 through the second adhesive member 1620. Because the support member 17 is implemented by omitting the second support portion ② compared to the support member 9 of FIG. 16, the antenna structure 81 located in the case 6 by using the support member 17 may be placed at a position further moved in the positive y-axis direction compared to the example of FIG. 16. In the example of FIG. 17, compared to the example of FIG. 16, the RF window area 3013 may be formed at a position further moved in the positive y-axis direction. For this reason, compared to the example of FIG. 16, in the example of FIG. 17, the bezel area B surrounding the display area 3011 is reduced, thereby making it easier to design by expanding the display area 3011. In this manner, the example of FIG. 17 may further reduce the possibility that the influence of the display 301 on the main beam 1660 formed by the antenna structure 81 will occur, compared to the example of FIG. 16.

When viewed from above the front plate 31 (e.g., when viewed in the negative z-axis direction), the RF window area 3013 may overlap in part with the non-conductive portion 1060, and the non-conductive portion 1060 may reduce the influence of the first sidewall 331 on the main beam 1660. The part 1071 of the conductive portion 1070 of the first sidewall 331 extending in the positive z-axis direction with respect to the first surface 801 of the antenna structure 81 may not overlap with the RF window area 3013 when viewed from above the front plate 31. For this reason, the effect of the conductive portion 1070 of the first sidewall 331 on the radiation performance of the antenna structure 81 may be substantially absent or insignificant to a level capable of securing the radiation performance of the antenna structure 81.

According to an embodiment of the disclosure, an electronic device (e.g., the electronic device 3 in FIG. 3) may include a housing (e.g., the housing 30 in FIG. 3). The housing may form a front surface (e.g., the front surface 30A in FIG. 3) of the electronic device, a rear surface (e.g., the rear surface 30B in FIG. 3) of the electronic device, and a side surface (e.g., the side surface 30C in FIG. 3) of the electronic device. The electronic device may include an antenna structure (e.g., the antenna structure 81 in FIG. 6 or 7) located in an inner space of the housing. The antenna structure may include a printed circuit board (e.g., the printed circuit board 811 in FIG. 6 or 7) having a first surface (e.g., the first surface 801 in FIG. 6) facing the front surface and a second surface (e.g., the second surface 802 in FIG. 7) facing in a direction opposite to the first surface.

The antenna structure may include at least one antenna element (e.g., the antenna elements 812*a*, 812*b*, 812*c*, 812*d*, and 812*e* in FIG. 6) located on the first surface or located inside the printed circuit board to be closer to the first surface than the second surface. The electronic device may include a support member combined with the housing. The antenna structure may be disposed on the support member. The support member on which the antenna structure is disposed may be inserted into a recess (e.g., the recess 1040 in FIG. 16) provided in a sidewall (e.g., the first sidewall 331 in FIG. 16) of the housing providing the side surface. The sidewall may include a connection portion (e.g., the first connection portion 1051 in FIG. 12 or 13). The connection portion may be combined with a front plate (e.g., the front plate 31 in FIG. 16) of the housing providing the front surface. The connection portion may be formed along an edge of the front plate. The connection portion may overlap with the front plate when viewed from above the front surface.

In some embodiments, a non-conductive portion (e.g., the non-conductive portion 1060 in FIG. 16) included in the connection portion may be located between the first surface and the front plate. The non-conductive portion may overlap with the at least one antenna element when viewed from above the front surface. The non-conductive portion may form at least in part a third surface (e.g., the third surface 1041 in FIG. 16) among surfaces providing the recess, the third surface facing the first surface. The support member may include a first support portion (e.g., the pair of first support portions ① in FIG. 8 or 9) inserted into a groove (e.g., the first groove 1061 or the second groove 1062 in FIG. 10, 11, 12, or 13) provided in the non-conductive portion.

According to an embodiment of the disclosure, the electronic device may further include a display (e.g., the display 301 in FIG. 16). The display may be located in the inner space of the housing (e.g., the housing 30 in FIG. 3). The display may be disposed on the front plate (e.g., the front plate 31 in FIG. 16). The display may be located to be spaced apart from the non-conductive portion (e.g., the non-conductive portion 1060 in FIG. 16) when viewed from above the front surface (e.g., the front surface 30A in FIG. 3). The front plate may include a bezel area (e.g., the bezel area B in FIG. 16) that does not overlap with a display area (e.g., the display area 3011 in FIG. 16) of the display when viewed from above the front surface and is combined with the connection portion. The at least one antenna element (e.g., the antenna elements 812*a*, 812*b*, 812*c*, 812*d*, and 812*e* in FIG. 8 or 9) may overlap with the bezel area and may not overlap with the display area, when viewed from above the front surface.

According to an embodiment of the disclosure, the display (e.g., the display 301 in FIG. 16) may further include a border area (e.g., the border area 3012 in FIG. 16) overlapping with the bezel area (e.g., the bezel area B in FIG. 16) when viewed from above the front surface (e.g., the front surface 30A in FIG. 3). The border area may not overlap with the at least one antenna element (e.g., the antenna elements 812*a*, 812*b*, 812*c*, 812*d*, and 812*e* in FIG. 8 or 9) when viewed from above the front surface.

According to an embodiment of the disclosure, the bezel area (e.g., the bezel area B in FIG. 16) may include, when viewed from above the front surface (e.g., the front surface 30A in FIG. 3), a first area (e.g., the first area B01 in FIG. 16) overlapping with the border area (e.g., the border area 3012 in FIG. 16) and a second area (e.g., the second area B02 in FIG. 16) not overlapping with the border area and combined with the connection portion (e.g., the first connection portion 1051 in FIG. 10, 11, 12, or 13). The antenna structure (e.g., the antenna structure 81 in FIG. 16) may radiate a main beam (e.g., the main beam 1660 in FIG. 16) in a direction the first surface (e.g., the first surface 801 in FIG. 16) faces. The main beam may pass through the second area.

According to an embodiment of the disclosure, the support member (e.g., the support member 9 in FIG. 8 or 9) may include a metal material.

According to an embodiment of the disclosure, the printed circuit board (e.g., the printed circuit board 811 in FIG. 6 or 7) may have side surfaces connecting the first surface (e.g., the first surface 801 in FIG. 6) and the second surface (e.g., the second surface 802 in FIG. 7). The side surfaces of the printed circuit board may include a first side surface (e.g., the first side surface S1 in FIG. 9) facing the sidewall (e.g., the first sidewall 331 in FIG. 16), a second side surface (e.g., the second side surface S2 in FIG. 9) positioned opposite to the first side surface, and third and fourth side surfaces (e.g., the third and fourth side surfaces S3 and S4 in FIG. 9) perpendicular to the first side surface and positioned opposite to each other. The first support portion (e.g., the pair of first support portions ① in FIG. 8 or 9) may be positioned to face the third side surface or the fourth side surface. A part (e.g., the first insert 901 or the second insert 902 in FIG. 8 or 9) of the first support portion may protrude with respect to the first surface (e.g., the first surface 801 in FIG. 8) and be inserted into the groove (e.g., the first groove 1061 or the second groove 1062 in FIG. 11 or 12).

According to an embodiment of the disclosure, the support member (e.g., the support member 9 in FIG. 8 or 9) may further include a third support portion (e.g., the third support portion ③ in FIG. 8) facing the second surface (e.g., the second surface 802 in FIG. 7) or a fourth support portion (e.g., the fourth support portion ④ in FIG. 9) facing the second side surface (e.g., the second side surface S2 in FIG. 9). The first support portion (e.g., the pair of first support portions ① in FIG. 8 or 9) may extend from the third support portion or the fourth support portion.

According to an embodiment of the disclosure, a part (e.g., the first insert 901 or the second insert 902 in FIG. 11, 12, or 13) of the first support portion inserted into the groove (e.g., the first groove 1061 or the second groove 1062 in FIG. 11, 12, or 13) may include a hemming structure.

According to an embodiment of the disclosure, the groove (e.g., the first groove 1061 or the second groove 1062 in FIG. 11, 12, or 13) may be formed in a form of a notch when viewed from above the front surface (e.g., the front surface 30A in FIG. 3).

According to an embodiment of the disclosure, the third surface (e.g., the third surface 1041 in FIG. 16) may be spaced apart from the first surface (e.g., the first surface 801 in FIG. 16). The non-conductive portion (e.g., the non-conductive portion 1060 in FIG. 16) may further include one or more support ribs (e.g., the plurality of support ribs 1063*a*, 1063*b*, 1063*c*, and 1063*d* in FIG. 11 or 12). The one or more support ribs may protrude and extend from the third surface and support the first surface. The one or more support ribs may not overlap with the at least one antenna element (e.g., the antenna elements 812*a*, 812*b*, 812*c*, 812*d*, and 812*e* in FIG. 11 or 13) when viewed from above the front surface (e.g., the front surface 30A in FIG. 3).

According to an embodiment of the disclosure, the surfaces providing the recess (e.g., the recess 1040 in FIG. 16) may include a fourth surface (e.g., the fourth surface 1042 in FIG. 16) positioned opposite to the third surface (e.g., the third surface 1041 in FIG. 16), and a fifth surface (e.g., the fifth surface 1043 in FIG. 16) connecting the third surface and the fourth surface. The support member (e.g., the support member 9 in FIG. 16) may further include a second support portion (e.g., the second support portion ② in FIG. 16) located between the printed circuit board and the fifth surface. An adhesive material (e.g., the second adhesive member 1620 in FIG. 16) may be disposed between the second support portion and the fifth surface.

According to an embodiment of the disclosure, the support member (e.g., the support member 9 in FIG. 16) may further include a third support portion (e.g., the third support portion ③ in FIG. 16) facing the second surface (e.g., the second surface 802 in FIG. 16). An adhesive material (e.g., the first adhesive member 1610 in FIG. 16) may be located between the second surface and the third support portion.

According to an embodiment of the disclosure, the support member (e.g., the support member 9 in FIG. 16) may further include a third support portion (e.g., the third support portion ③ in FIG. 16) facing the second surface (e.g., the second surface 802 in FIG. 16). The third support portion may be supported by a rear plate (e.g., the rear plate 32 in FIG. 16) of the housing (e.g., the housing 30 in FIG. 3), the rear plate providing the rear surface (e.g., the rear surface 30B in FIG. 3).

According to an embodiment of the disclosure, the third support portion (e.g., the third support portion ③ in FIG. 16) may have a convex shape (e.g., the convex structure 1650 in FIG. 16) protruding toward the rear plate (e.g., the rear plate 32 in FIG. 16).

According to an embodiment of the disclosure, the sidewall (e.g., the first sidewall 331 in FIG. 16) may include a conductive portion (e.g., the conductive portion 1070 in FIG. 16) connected to the non-conductive portion (e.g., the non-conductive portion 1060 in FIG. 16). The conductive portion may form at least in part the side surface (e.g., the side surface 30C in FIG. 3) of the electronic device. The third surface (e.g., the third surface 1041 in FIG. 16) may have a non-conductive region provided by the non-conductive portion and a conductive region provided by the conductive portion. A part of the conductive portion located toward the front plate with respect to the first surface and connected to the non-conductive portion may not overlap with the at least one antenna element (e.g., the antenna elements 812*a*, 812*b*, 812*c*, 812*d*, and 812*e* in FIG. 8 or 9) when viewed from above the front surface (e.g., the front surface 30A in FIG. 3).

According to an embodiment of the disclosure, an electronic device (e.g., the electronic device 3 in FIG. 3) may include a housing (e.g., the housing 30 in FIG. 3). The housing may form a front surface (e.g., the front surface 30A in FIG. 3) of the electronic device, a rear surface (e.g., the rear surface 30B in FIG. 3) of the electronic device, and a side surface (e.g., the side surface 30C in FIG. 3) of the electronic device. The electronic device may include an antenna structure (e.g., the antenna structure 81 in FIG. 6 or 7) located in an inner space of the housing. The antenna structure may include a printed circuit board (e.g., the printed circuit board 811 in FIG. 6 or 7). The printed circuit board may have a first surface (e.g., the first surface 801 in FIG. 6) facing the front surface, a second surface (e.g., the second surface 802 in FIG. 7) facing in a direction opposite to the first surface, a first side surface (e.g., the first side surface S1 in FIG. 9) facing the side surface of the electronic device, a second side surface (e.g., the second side surface S2 in FIG. 6) positioned opposite to the first side surface, and third and fourth side surfaces (e.g., the third and fourth side surfaces S3 and S4 in FIG. 9) perpendicular to the first side surface and positioned opposite to each other.

In some embodiments, the antenna structure may include at least one antenna element (e.g., the plurality of antenna elements 812*a*, 812*b*, 812*c*, 812*d*, and 812*e* in FIG. 9) located on the first surface or located inside the printed circuit board to be closer to the first surface than the second surface. The electronic device may include a support member (e.g., the support member 9 in FIG. 8 or 9) combined with the housing. The antenna structure may be disposed on the support member. The support member on which the antenna structure is disposed may be inserted into a recess (e.g., the recess 1040 in FIG. 16) provided in a sidewall (e.g., the first sidewall 331 in FIG. 16) of the housing providing the side surface of the electronic device.

In some embodiments, the sidewall may include a connection portion (e.g., the first connection portion 1051 in FIG. 11, 12, or 13). The connection portion may be combined with a front plate (e.g., the front plate 31 in FIG. 16) of the housing providing the front surface. The connection portion may be formed along an edge of the front plate and may overlap with the front plate when viewed from above the front surface. A non-conductive portion (e.g., the non-conductive portion 1060 in FIG. 16) included in the connection portion may be located between the first surface and the front plate. The non-conductive portion may overlap with the at least one antenna element when viewed from above the front surface, and may form at least in part a third surface (e.g., the third surface 1041 in FIG. 16) among surfaces providing the recess, the third surface facing the first surface. The support member may include a first support portion (e.g., the pair of first support portions ① in FIG. 8 or 9) located to face the third side surface or the fourth side surface. A part (e.g., the first insert 901 or the second insert 902 in FIG. 8 or 9) of the first support portion may protrude with respect to the first surface and be inserted into a groove (e.g., the first groove 1061 or the second groove 1062 in FIG. 11, 12, or 13) provided in the non-conductive portion in a form of a notch when viewed from above the front surface.

According to an embodiment of the disclosure, the part (e.g., the first insert 901 or the second insert 902 in FIG. 8 or 9) of the first support portion inserted into the groove (e.g., the first groove 1061 or the second groove 1062 in FIG. 11, 12, or 13) may include a hemming structure.

According to an embodiment of the disclosure, the third surface (e.g., the third surface 1041 in FIG. 16) may be spaced apart from the first surface (e.g., the first surface 801 in FIG. 16). The non-conductive portion (e.g., the non-conductive portion 1060 in FIG. 16) may further include one or more support ribs (e.g., the plurality of support ribs 1063*a*, 1063*b*, 1063*c*, and 1063*d* in FIG. 11) protruding and extending from the third surface and supporting the first surface. The one or more support ribs may not overlap with the at least one antenna element (e.g., the plurality of antenna elements 812*a*, 812*b*, 812*c*, 812*d*, and 812*e* in FIG. 13) when viewed from above the front surface (e.g., the front surface 30A in FIG. 3).

According to an embodiment of the disclosure, the surfaces providing the recess (e.g., the recess 1040 in FIG. 16) may include a fourth surface (e.g., the fourth surface 1042 in FIG. 16) positioned opposite to the third surface (e.g., the third surface 1041 in FIG. 16), and a fifth surface (e.g., the fifth surface 1043 in FIG. 16) connecting the third surface and the fourth surface. The support member (e.g., the support member 9 in FIG. 16) may further include a second support portion (e.g., the second support portion ② in FIG. 16) located between the first side surface (e.g., the first side surface S1 in FIG. 9) and the fifth surface, and a third support portion (e.g., the third support portion ③ in FIG. 16) facing the second surface (e.g., the second surface 802 in FIG. 16). An adhesive material (e.g., the second adhesive member 1620 in FIG. 16) may be disposed between the second support portion and the fifth surface. The third support portion may be supported by a rear plate (e.g., the rear plate 32 in FIG. 16) of the housing (e.g., the housing 30 in FIG. 3), the rear plate providing the rear surface (e.g., the rear surface 30B in FIG. 3).

According to an embodiment of the disclosure, the electronic device may further include a display (e.g., the display 301 in FIG. 16). The display may be located in the inner space of the housing (e.g., the housing 30 in FIG. 3) and disposed on the front plate (e.g., the front plate 31 in FIG. 16). The display may be located to be spaced apart from the non-conductive portion (e.g., the non-conductive portion 1060 in FIG. 16) when viewed from above the front surface (e.g., the front surface 30A in FIG. 3). The front plate may include a bezel area (e.g., the bezel area B in FIG. 16) that does not overlap with a display area (e.g., the display area 3011 in FIG. 16) of the display when viewed from above the front surface (e.g., the front surface 30A in FIG. 3) and is combined with the connection portion (e.g., the first connection portion 1051 in FIG. 11, 12, or 13). The at least one antenna element (e.g., the plurality of antenna elements 812*a*, 812*b*, 812*c*, 812*d*, and 812*e* in FIG. 13) may overlap with the bezel area and may not overlap with the display area, when viewed from above the front surface (e.g., the front surface 30A in FIG. 3). The antenna structure (e.g., the antenna structure 81 in FIG. 16) may radiate a main beam (e.g., the main beam 1660 in FIG. 16) in a direction the first surface (e.g., the first surface 801 in FIG. 16) faces. The main beam may pass through the second area.

The embodiments of the disclosure are only examples presented in order to easily explain technical contents and facilitate comprehension of the disclosure, and are not intended to limit the technical scope of the disclosure. Therefore, the technical scope of the disclosure should be construed to include all changes or modifications derived from the technical ideas of various embodiments of the disclosure in addition to the embodiments disclosed herein.

The invention claimed is:

1. An electronic device comprising:

a housing comprising a front surface of the electronic device, a rear surface of the electronic device, and a side surface of the electronic device;

an antenna structure located in an inner space of the housing, the antenna structure including a printed circuit board having a first surface facing the front surface and a second surface facing in a direction opposite to the first surface, and including at least one antenna element located on the first surface or located inside the printed circuit board to be closer to the first surface than the second surface; and a support member on which the antenna structure is disposed, and combined with the housing, wherein the support member on which the antenna structure is disposed is inserted into a recess provided in a sidewall of the side surface of the housing, wherein the sidewall includes a connection portion with which a front plate of the front surface of the housing is combined, the connection portion being formed along an edge of the front plate and overlapping with the front plate when viewed from above the front surface, wherein a non-conductive portion included in the connection portion is located between the first surface and the front plate, overlaps with the at least one antenna element when viewed from above the front surface, and provides at least in part a third surface among surfaces providing the recess, the third surface facing the first surface, wherein the support member includes a first support portion inserted into a groove provided in the non-conductive portion, and wherein a part of the first support portion inserted into the groove includes a hemming structure.

2. The electronic device of claim 1, further comprising:

a display located in the inner space of the housing and disposed on the front plate, wherein the display is located to be spaced apart from the non-conductive portion when viewed from above the front surface, wherein the front plate includes a bezel area that does not overlap with a display area of the display when viewed from above the front surface, the bezel area combined with the connection portion, and wherein the at least one antenna element overlaps with the bezel area and does not overlap with the display area, when viewed from above the front surface.

3. The electronic device of claim 2, wherein the display further includes a border area overlapping with the bezel area when viewed from above the front surface, and wherein the border area does not overlap with the at least one antenna element when viewed from above the front surface.

4. The electronic device of claim 3, wherein the bezel area includes, when viewed from above the front surface, a first area overlapping with the border area and a second area not overlapping with the border area, the second area combined with the connection portion, and wherein the antenna structure radiates a main beam in a direction the first surface faces, and the main beam passes through the second area.

5. The electronic device of claim 1, wherein the support member includes a metal material.

6. The electronic device of claim 1, wherein the printed circuit board has side surfaces connecting the first surface and the second surface, wherein the side surfaces of the printed circuit board include a first side surface facing the sidewall, a second side surface positioned opposite to the first side surface, and third and fourth side surfaces perpendicular to the first side surface and positioned opposite to each other, wherein the first support portion is positioned to face the third side surface or the fourth side surface, and wherein a part of the first support portion protrudes with respect to the first surface and is inserted into the groove.

7. The electronic device of claim 6, wherein the support member further includes at least one of a third support portion facing the second surface and a fourth support portion facing the second side surface, and wherein the first support portion extends from at least one of the third support portion and the fourth support portion.

8. The electronic device of claim 1, wherein the groove is formed in a form of a notch when viewed from above the front surface.

9. The electronic device of claim 1, wherein the third surface is spaced apart from the first surface, wherein the non-conductive portion further includes one or more support ribs protruding and extending from the third surface and supporting the first surface, and wherein the one or more support ribs do not overlap with the at least one antenna element when viewed from above the front surface.

10. The electronic device of claim 1, wherein the surfaces providing the recess include a fourth surface positioned opposite to the third surface, and a fifth surface connecting the third surface and the fourth surface, wherein the support member further includes a second support portion located between the printed circuit board and the fifth surface, and wherein an adhesive material is disposed between the second support portion and the fifth surface.

11. The electronic device of claim 1, wherein the support member further includes a third support portion having a surface facing the second surface, and wherein an adhesive material is located between the second surface and the third support portion.

12. The electronic device of claim 1, wherein the support member further includes a third support portion having a surface facing the second surface, and wherein the third support portion is supported by a rear plate of the housing, the rear plate providing the rear surface.

13. The electronic device of claim 12, wherein the third support portion has a convex shape protruding toward the rear plate.

14. The electronic device of claim 1, wherein the sidewall includes a conductive portion connected to the non-conductive portion and providing at least in part the side surface of the electronic device, wherein the third surface has a non-conductive region provided by the non-conductive portion and a conductive region provided by the conductive portion, and wherein a part of the conductive portion located toward the front plate with respect to the first surface and connected to the non-conductive portion does not overlap with the at least one antenna element when viewed from above the front surface.

15. An electronic device comprising:

a housing comprising a front surface of the electronic device, a rear surface of the electronic device, and a side surface of the electronic device;

an antenna structure located in an inner space of the housing, the antenna structure including a printed circuit board having a first surface facing the front surface, a second surface facing in a direction opposite to the first surface, a first side surface facing the side surface of the electronic device, a second side surface positioned opposite to the first side surface, and third and fourth side surfaces perpendicular to the first side surface and positioned opposite to each other, and including at least one antenna element located on the first surface or located inside the printed circuit board to be closer to the first surface than the second surface; and a support member on which the antenna structure is disposed, and combined with the housing, wherein the support member on which the antenna structure is disposed is inserted into a recess provided in a sidewall of the side surface of the housing, wherein the sidewall includes a connection portion with which a front plate of the front surface of the housing is combined, the connection portion being formed along an edge of the front plate and overlapping with the front plate when viewed from above the front surface, wherein a non-conductive portion included in the connection portion is located between the first surface and the front plate, overlaps with the at least one antenna element when viewed from above the front surface, and provides at least in part a third surface among surfaces providing the recess, the third surface facing the first surface, wherein the support member includes a first support portion located to face the third side surface or the fourth side surface, wherein a part of the first support portion protrudes with respect to the first surface and is inserted into a groove provided in the non-conductive portion, the groove in a form of a notch when viewed from above the front surface, and wherein a part of the first support portion inserted into the groove includes a hemming structure.

16. The electronic device of claim 15, wherein the third surface is spaced apart from the first surface, wherein the non-conductive portion further includes one or more support ribs protruding and extending from the third surface and supporting the first surface, and wherein the one or more support ribs do not overlap with the at least one antenna element when viewed from above the front surface.

17. The electronic device of claim 15, wherein the surfaces providing the recess include a fourth surface positioned opposite to the third surface, and a fifth surface connecting the third surface and the fourth surface, wherein the support member further includes a second support portion located between the first side surface and the fifth surface, and a third support portion facing the second surface, wherein an adhesive material is disposed between the second support portion and the fifth surface, and wherein the third support portion is supported by a rear plate of the housing, the rear plate providing the rear surface.

18. The electronic device of claim 1, further comprising:

a display located in the inner space of the housing and disposed on the front plate, wherein the display is located to be spaced apart from the non-conductive portion when viewed from above the front surface, wherein the front plate includes a bezel area that does not overlap with a display area of the display when viewed from above the front surface and is combined with the connection portion, wherein the at least one antenna element overlaps with the bezel area and does not overlap with the display area, when viewed from above the front surface, and wherein the antenna structure radiates a main beam in a direction the first surface faces, and the main beam passes through the second area.

19. An electronic device comprising:

a housing comprising a front surface of the electronic device, a rear surface of the electronic device, and a side surface of the electronic device;

an antenna structure located in an inner space of the housing, the antenna structure including a printed circuit board having a first surface facing the front surface and a second surface facing in a direction opposite to the first surface, and including at least one antenna element located on the first surface or located inside the printed circuit board to be closer to the first surface than the second surface; and a support member on which the antenna structure is disposed, and combined with the housing, wherein the support member on which the antenna structure is disposed is inserted into a recess provided in a sidewall of the side surface of the housing, wherein the sidewall includes a connection portion with which a front plate of the front surface of the housing is combined, the connection portion being formed along an edge of the front plate and overlapping with the front plate when viewed from above the front surface, wherein a non-conductive portion included in the connection portion is located between the first surface and the front plate, overlaps with the at least one antenna element when viewed from above the front surface, and provides at least in part a third surface among surfaces providing the recess, the third surface facing the first surface, wherein the support member includes a first support portion inserted into a groove provided in the non-conductive portion, wherein the surfaces providing the recess include a fourth surface positioned opposite to the third surface, and a fifth surface connecting the third surface and the fourth surface, wherein the support member further includes a second support portion located between the printed circuit board and the fifth surface, and wherein an adhesive material is disposed between the second support portion and the fifth surface.

* * * * *